United States Patent [19]
Teicher

[11] Patent Number: 5,744,787
[45] Date of Patent: Apr. 28, 1998

[54] SYSTEM AND METHOD FOR RETAIL

[75] Inventor: Mordechai Teicher, Kfar Saba, Israel

[73] Assignee: Advanced Retail Systems Ltd., Kiriat Ono, Israel

[21] Appl. No.: 533,599

[22] Filed: Sep. 25, 1995

[30] Foreign Application Priority Data

| Sep. 25, 1994 | [IL] | Israel | 111055 |
| Jun. 1, 1995 | [IL] | Israel | 113980 |
| Sep. 4, 1995 | [IL] | Israel | 115164 |

[51] Int. Cl.⁶ .............................. G06K 5/00; G06F 17/60
[52] U.S. Cl. ................................... 235/380; 235/379
[58] Field of Search ................... 235/380, 375, 235/379, 487; 364/704

[56] References Cited

U.S. PATENT DOCUMENTS

| 4,341,951 | 7/1982 | Benton | 235/379 |
| 4,634,845 | 1/1987 | Hale et al. | 235/380 |
| 4,689,478 | 8/1987 | Hale et al. | 235/380 |
| 4,859,837 | 8/1989 | Halpern | 235/380 |
| 4,877,950 | 10/1989 | Halpern | 235/487 |
| 4,882,474 | 11/1989 | Anderl et al. | 235/380 |
| 4,906,828 | 3/1990 | Halpern | 235/379 |
| 4,992,646 | 2/1991 | Collin | 235/380 |
| 5,030,806 | 7/1991 | Collin | 235/375 |
| 5,221,838 | 6/1993 | Gutman et al. | 235/380 X |
| 5,233,547 | 8/1993 | Kapp et al. | 364/705.02 |
| 5,233,947 | 8/1993 | Kapp et al. | 235/380 |
| 5,426,281 | 6/1995 | Abecassis | 235/379 |
| 5,438,184 | 8/1995 | Roberts et al. | 235/380 |
| 5,478,993 | 12/1995 | Derksen | 235/380 |
| 5,557,516 | 9/1996 | Hogan | 364/406 |

*Primary Examiner*—Donald T. Hajec
*Assistant Examiner*—Thien Minh Le
*Attorney, Agent, or Firm*—Skjerven, Morrill, MacPherson, Franklin & Friel LLP

[57] ABSTRACT

A retail unit facilitating a purchase of a customer having an electronic wallet (9) which includes an electronic checkbook (320) and an electronic purse (310). The retail unit includes a POS (10) which determines the purchase price, and a payment unit (8) for receiving payment from electronic wallet (9). Payment unit (8), upon receipt of an electronic wallet (9) and of a purchase price from POS (10), determines automatically whether to: (a) receive via electronic checkbook (320) a purchase price $\geq$ a predetermined minimal checkbook payment sum; or, (b) receive the purchase price from electronic purse (310); or, (c) first replenish the electronic purse (310) via electronic checkbook (320) with at least the larger of a predetermined minimal purse replenishment sum and the difference between the purchase price and the electronic purse's stored value, and then receive the purchase price from electronic purse (310).

6 Claims, 17 Drawing Sheets

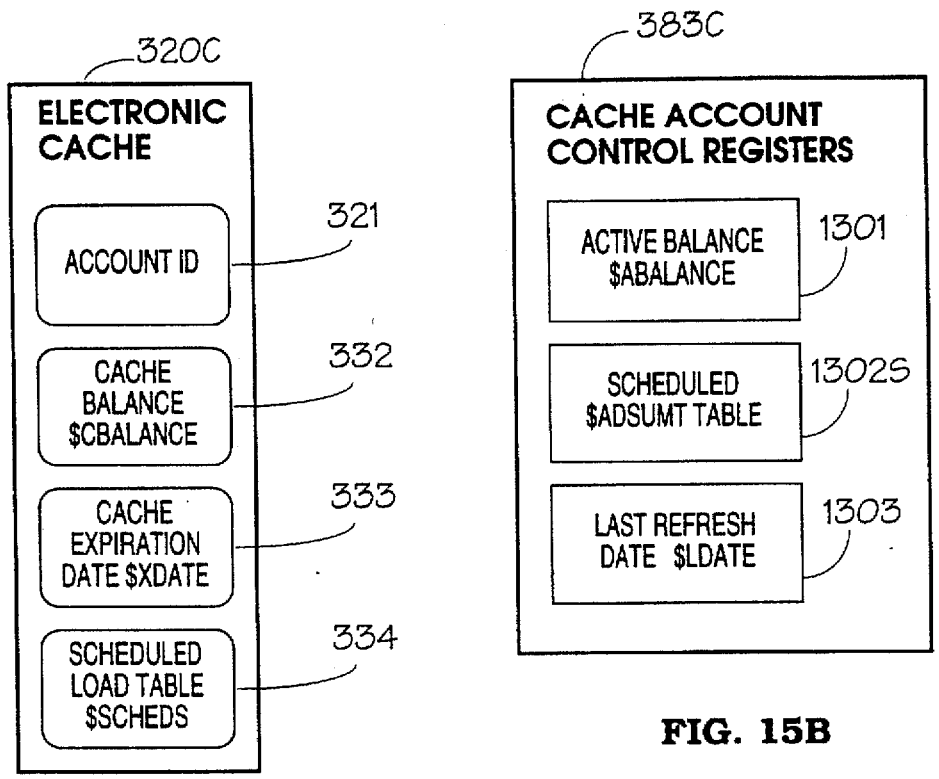
FIG. 15A
FIG. 15B
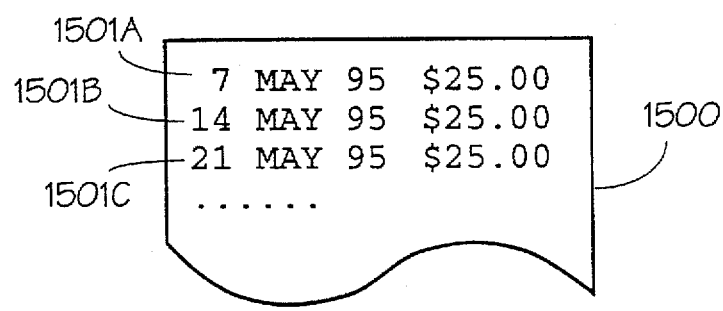
FIG. 15C

SYSTEM AND METHOD FOR RETAIL

FIELD OF THE INVENTION

The present invention relates to retail systems generally and more particularly to automatic retail systems incorporating card payment.

BACKGROUND OF THE INVENTION

Retail is a process involving payment against the supply of goods and/or services. In automatic retail, both supply and payment do not require human attendance. Prior art automatic retail is usually based on the controlled-supply concept, i.e. the customer deposits a sum, the automatic retail system controls the supply of merchandise items chosen by the customer for a total cost within this sum, and upon purchase completion the unused part of the deposited sum is returned. Common vending machines and public telephones are examples of controlled supply automatic retail systems.

There are also known in the art prior art cashless payment means. These include payment cards, such as the electronic checkbook (i.e. a credit card or a bank debit card) for charging a credit or bank account, the electronic purse which is a rechargeable stored-value card, loaded with a sum at dedicated replenishment devices and depleting the loaded sum on payment, and the combo smart card, (termed herein "electronic wallet"). The electronic wallet includes both an electronic checkbook and an electronic purse. The execution of electronic checkbook transactions is relatively costly, and can be justified only for transactions which exceed a pre-defined minimum size; transactions whose value is below this minimum can be executed with the electronic purse.

Present use of payment cards, in particular the use of electronic wallets, is associated with many deficiencies, a few examples of which are provided herein below:

a. Since electronic wallets are depleted at each payment, the customer must execute regularly purse replenishment transactions at suitable replenishment devices, which is inconvenient.
b. An electronic wallet may occasionally fail to pay for a purchase whose value is higher than the current balance in the electronic purse but is still below the minimum value allowed for the electronic checkbook.
c. Automatic controlled-supply purchases, e.g. a public telephone call or filling a gas tank, may be interrupted at any time when the electronic purse is exhausted.
d. To reduce the inconvenience, failure and interruption described above, many customers tend to overload their electronic purse during replenishment transactions, which reduces the interest-bearing deposit in the bank, and in electronic purse systems which do not employ audit trail, increases the damage when an electronic wallet is lost.
e. Electronic purse operation requires setting up a costly infrastructure of replenishment devices, such as special ATMs (automatic teller machines), modified public telephones or dedicated home terminals.

SUMMARY OF THE INVENTION

The following terms will be used herein as follows:
1. Retail system—a system operating to enable a customer to purchase merchandise items, including goods and/or services, against payment.
2. Retail unit—a part of a retail system for serving a customer on purchase, operating to determine the purchase contents, calculate its price and receive payment therefor.
3. Point of sale (POS)—a part of a retail unit operating to determine the contents of a purchase and to calculate its price.
4. Payment unit—a part of a retail unit operating to receive payment from the customer.
5. Payment system—a system including a plurality of payment units, payment means carried by customers and any other means needed to execute payment at a payment unit with the customer's payment means. For instance, if the customer's payment means is a credit card, the payment system also includes a transaction processing center of the respective financial institution and means to validate, communicate and execute payment transactions.
6. Automatic retail system—a retail system which does not require human operators for controlling the purchase or collecting the payment. However, humans may be involved in tasks such as maintenance.
7. Controlled-supply automatic retail system—an automatic retail system wherein a point of sale controls the supply of each merchandise item to a customer.
8. Free-access automatic retail system—an automatic retail system enabling a customer to remove or consume merchandise items of his choice while a point of sale identifies these items during purchase or at its completion.
9. Payment card—a device bearing machine-readable information which is useful for payment. A preferred payment card according to the present invention is an electronic wallet as defined hereinbelow.
10. Smart card—a secured payment card in which the machine-readable information can be accessed only through authorized protocols.
11. Electronic checkbook—a personal payment card which bears information identifying at least one central account and authorizing transactions therewith. According to the present invention the preferred central account is a credit account or a bank account. Non limiting examples of electronic checkbooks include the conventional credit card and bank debit card.
12. Electronic purse—a payment card which stores and allows increasing and reducing balance information regarding the value, also called electronic cash, stored therein.
13. Electronic wallet—a smart card which includes inter alia an electronic checkbook and an electronic purse.

A major object of the present invention is to provide a retail unit allowing electronic wallet payment while overcoming the disadvantages associated with the use of prior art electronic wallets.

Another major object of the present invention is to provide a payment unit supporting free-access automatic retail.

Another major object of the present invention is to provide a retail unit which is operable off-line.

The retail unit of the present invention comprises an electronic wallet payment unit, featuring any combination of the following characteristics:

It is capable of charging any sum between zero and a maximal sum accessible at a central account via the electronic checkbook of the electronic wallet, thus eliminating payment failure and purchase interruption.

It eliminates the need to visit purse replenishment devices in order to maintain sufficient purse balance, thus eliminating the associated inconvenience.

It eliminates the need for setting up a purse replenishment infrastructure thus eliminating the associated cost.

It minimizes the amount of electronic cash carried in the electronic wallet, thus minimizing loss risks.

It supports free-access automatic retail.

It provides sufficient security in off-line wallet transactions, including in off-line replenishment of the electronic purse via the electronic checkbook, in order to minimize communication requirements and transaction costs.

It provides an electronic wallet system with enhanced off-line security, wherein electronic wallets can be supplied to customers of all ages and financial records and can be used by them even in off-line transactions.

There is thus provided, according to a preferred embodiment of the present invention, a retail unit serving a customer on a purchase, the customer having an electronic wallet for paying for a purchase via its electronic checkbook sums equal to or larger than a predetermined minimal checkbook payment sum, for paying from its electronic purse sums equal to or smaller than the value stored therein, and for paying for replenishing the electronic purse via the electronic checkbook sums equal to or larger than a predetermined minimal purse replenishment sum, the retail unit includes:

a. a point of sale for determining a purchase price; and
b. a payment unit interfacing with the electronic wallet and communicating with the point of sale for retrieving the purchase price therefrom and for automatically selecting, according to the purchase price, the value stored in the electronic purse, the minimal checkbook payment sum and the minimal purse replenishment sum, whether to receive the purchase price via the electronic checkbook, or to receive the purchase price from the electronic purse, or to receive via the electronic checkbook a calculated purse replenishment sum which is at least the larger of the minimal purse replenishment sum and the difference between the purchase price and the value stored in the electronic purse, to replenish the electronic purse with the calculated purse replenishment sum and to receive the purchase price from the electronic purse.

Further, according to a preferred embodiment of the present invention the payment unit includes:

a. an electronic checkbook transaction unit for receiving payment via the electronic checkbook;
b. an electronic purse payment unit for receiving payment from the electronic purse;
c. an electronic purse loading unit for replenishing the electronic purse; and
d. an automatic transaction manager performing the automatically selecting and operative to
   activate the electronic checkbook transaction unit to receive the purchase price via the electronic checkbook, or
   to activate the electronic purse payment unit to receive the purchase price from the electronic purse, or
   to activate the electronic checkbook transaction unit to receive via the electronic checkbook the calculated purse replenishment sum, to activate the electronic purse loading unit to replenish the electronic purse with the calculated purse replenishment sum and to activate the electronic purse payment unit to receive the purchase price from the electronic purse.

Additionally, according to a preferred embodiment of the present invention the payment unit may also include an electronic cash drawer and wherein the electronic purse payment unit is operative to deposit the purse payment in the electronic cash drawer and the electronic purse loading unit is operative to replenish the electronic purse by transferring the calculated purse replenishment sum from the electronic cash drawer to the electronic purse.

Further, according to a preferred embodiment of the present invention the electronic checkbook is an electronic cache, the electronic cache further includes a storage device for storing a cache balance and an expiration date, the payment unit is operative to check the cache balance and the expiration date, to reject payments attempted on insufficient cache balances or after the expiration date and to decrease the cache balance upon cache payment for purchase or replenishment.

There is also provided, in accordance with a preferred embodiment of the present invention, a retail unit serving a customer on a purchase, the customer having an electronic wallet for paying for a purchase via its electronic checkbook sums equal to or larger than a predetermined minimal checkbook payment sum, for paying from its electronic purse sums equal to or smaller than the value stored therein, and for paying for replenishing the electronic purse via the electronic checkbook sums equal to or larger than a predetermined minimal purse replenishment sum, the retail unit includes:

a. a point of sale for determining a purchase price; and
b. a payment unit interfacing with the electronic wallet and communicating with the point of sale for retrieving the purchase price therefrom, the payment unit comprising:
c. an electronic checkbook transaction unit for receiving payment via the electronic checkbook;
d. an electronic cash drawer;
e. an electronic purse payment unit for receiving payment from the electronic purse and depositing it in the electronic cash drawer;
f. an electronic purse loading unit for replenishing the electronic purse by transferring a sum from the electronic cash drawer to the electronic purse; and
g. an automatic transaction manager for automatically selecting, according to the purchase price, the value stored in the electronic purse, the minimal checkbook payment sum and the minimal purse replenishment sum, whether
   to activate the electronic checkbook transaction unit to receive the purchase price via the electronic checkbook, or
   to activate the electronic purse payment unit to receive the purchase price from the electronic purse and deposit it in the electronic cash drawer; or
   to activate the electronic checkbook transaction unit to receive via the electronic checkbook a calculated purse replenishment sum which is at least the larger of the minimal purse replenishment sum and the difference between the purchase sum and the value stored in the electronic purse, and to activate the electronic purse loading unit to replenish the electronic purse from the electronic cash drawer with the difference between the calculated purse replenishment sum and the purchase price.

There is also provided, in accordance with a preferred embodiment of the present invention, a retail unit serving a customer on a purchase, the customer having an electronic wallet for paying from its electronic purse sums equal to or smaller than the value stored therein, and for paying for replenishing the electronic purse via the electronic checkbook of the electronic wallet sums equal to or larger than a predetermined minimal purse replenishment sum, the retail unit includes:

a. a point of sale for determining a purchase price; and
b. a payment unit interfacing with the electronic wallet and communicating with the point of sale for retrieving the purchase price therefrom, the payment unit comprising:
c. an electronic purse payment unit for receiving payment from the electronic purse;
d. an electronic purse loading unit for replenishing the electronic purse;

e. an electronic checkbook transaction unit for receiving via the electronic checkbook sums for the replenishment of the electronic purse; and g. an automatic transaction manager for automatically selecting, according to the purchase price, the value stored in the electronic purse and the minimal purse replenishment sum, whether to activate the electronic purse payment unit to receive the purchase price from the electronic purse, or to activate the electronic checkbook transaction unit to receive via the electronic checkbook a calculated purse replenishment sum which is at least the larger of the minimal purse replenishment sum and the difference between the purchase sum and the value stored in the electronic purse, to activate the electronic purse loading unit to replenish the electronic purse with the calculated purse replenishment sum and to activate the purse payment unit to receive the purchase price from the electronic purse.

Additionally, according to a preferred embodiment of the present invention the payment unit may include an electronic cash drawer and wherein the electronic purse payment unit is operative to deposit the purse payment in the electronic cash drawer and the electronic purse loading unit is operative to replenish the electronic purse by transferring the calculated purse replenishment sum from the electronic cash drawer to the electronic purse.

Further, the retail units of the present invention may form part of a controlled supply automatic retail system and the point of sale is operative to control the operation of the controlled supply automatic retail system.

Further, the point of sale of any of the retail units may be a cash register operated by a cashier for determining the price of a manual purchase.

Still further, the retail unit of the present invention may form part of a single-pass free-access automatic retail system having a predefined maximal purchase price and wherein the payment unit includes means operative to selectively receive, retain and release the electronic wallet and wherein upon receipt of the electronic wallet the payment unit is operative to retain the electronic wallet, to validate that the maximal purchase price can be received through the electronic wallet, to provide an indication to the point of sale if the validation is successful, the point of sale subsequently enabling, upon the indication, free-access of the customer to an accessible inventory of goods and/or services to the customer; and upon barring the free-access, the point of sale calculates the purchase price and the payment unit operates to receive the purchase price and subsequently to release the electronic wallet.

Alternatively, the retail unit of the present invention may form part of a dual-pass free-access automatic retail system, wherein the point of sale is located at an exit location of the dual-pass free-access automatic retail system.

There is also provided, in accordance with a preferred embodiment of the present invention a retail method for serving a customer on a purchase, the customer having an electronic wallet for paying for a purchase via its electronic checkbook sums equal to or larger than a predetermined minimal checkbook payment sum, for paying from its electronic purse sums equal to or smaller than the value stored therein, and for paying for replenishing the electronic purse via the electronic checkbook sums equal to or larger than a predetermined minimal purse replenishment sum, the method includes the following steps:

a. determining a purchase price; and b. automatically selecting, according to the purchase price, the value stored in the electronic purse, the minimal checkbook payment sum and the minimal purse replenishment sum, whether to receive the purchase price via the electronic checkbook, or to receive the purchase price from the electronic purse, or to receive via the electronic checkbook a calculated purse replenishment sum which is at least the larger of the minimal purse replenishment sum and the difference between the purchase sum and the value stored in the electronic purse, to replenish the electronic purse with the calculated purse replenishment sum and to receive the purchase price from the electronic purse.

Further, according to a preferred method of the present invention the payment unit also includes an electronic cash drawer, and the method further includes the steps of depositing the purse payment in the electronic cash drawer and replenishing the electronic purse by transferring the calculated purse replenishment sum from the electronic cash drawer to the electronic purse.

The retail method of the present invention may be employed in a single-pass free-access automatic retail system having a predetermined maximal purchase price wherein the method also include the steps of a. validating that the maximal purchase price can be received through the electronic wallet, and if the validation is successful, retaining the electronic wallet and subsequently enabling free-access of the customer to an accessible inventory of goods and/or services; and b. upon barring the free-access, calculating the purchase price and upon receipt thereof from the electronic wallet, releasing the electronic wallet.

Finally, according to a preferred embodiment of the present invention the electronic checkbook is an electronic cache having a storage device for storing a cache balance and an expiration date, and wherein the method further include the steps of checking the cache balance and the expiration date, rejecting payments attempted on insufficient cache balance or after the expiration date and decreasing the cache balance upon cache payment for purchase or replenishment.

BRIEF DESCRIPTION OF THE DRAWINGS

The present invention will be understood and appreciated more fully from the following detailed description taken in conjunction with the appended drawings in which:

FIG. 15A–15C are schematic block diagram illustrations describing a variation of the payment system described in FIGS. 12–13, with advantages as child payment means;

DETAILED DESCRIPTION OF THE PREFERRED EMBODIMENTS

Figure 1:
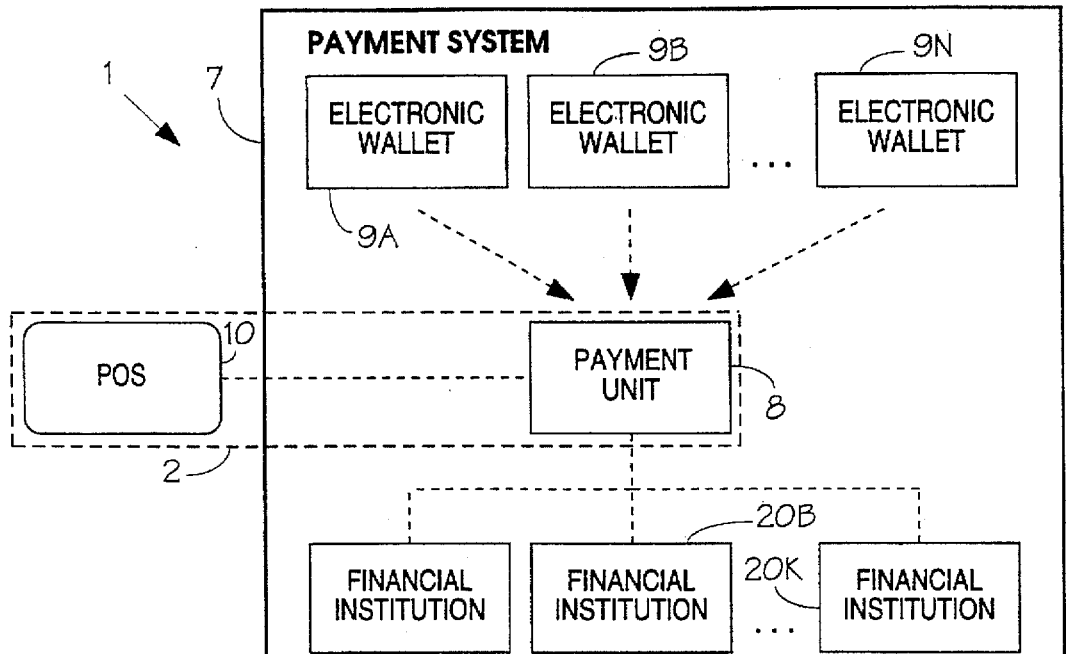
FIG. 1 is a schematic block diagram illustration of a retail unit, constructed according to a preferred embodiment of the present invention.

A Retail Unit for Manual Retail and for Controlled-Supply Automatic Retail Reference is made to FIG. 1 which illustrates a preferred embodiment of the present invention. The retail system of FIG. 1, generally referenced 1, incorporates a payment system 7 which is a substantially failure-free system for executing payment orders received from a Point Of Sale (POS) 10. Non-limiting examples for POS 10 are a supermarket cash register, or a control unit of a vending machine, a public telephone or the gas pump in a gas station.

Payment system 7 comprises a payment unit 8 communicating with POS 10 for receiving payment requests, interfacing with any one of electronic wallets 9A–9N for payment therefrom and communicating as needed with transaction processing centers of financial institutions 20A–20K to execute electronic checkbook transactions. At each purchase, payment unit 8 interfaces with an electronic wallet and automatically determines the transactions to be executed for payment, i.e. a transaction operating to pay by electronic purse of the electronic wallet or to first replenish the electronic purse by payment from a remote account via the electronic checkbook and then to pay with the electronic purse, or to pay from a remote account via the electronic checkbook as described in detail hereinbelow.

Payment unit 8 communicates selectively with processing centers of financial institutions 20A–20K respective to the central accounts related to the electronic wallets presented at the payment unit.

Processing centers of financial institution 20A–20K execute transactions related to central accounts maintained by the respective financial institutions, e.g. credit accounts or bank accounts, the accounts being identified and accessible by the electronic purses included in the electronic wallets.

Payment unit 8 may operate with any number of electronic wallets 9A–9N.

It will be appreciated that the interface between an electronic wallet and payment unit 8 may be by contact or by contactless communication or even from distance through a communication link. The communication between payment unit 8 and a processing center of a financial institution can be executed on line, or electronic checkbook transactions may be recorded at payment unit 8 and transferred thereafter to processing centers of financial institutions for batch processing, as will be described in more detail hereinbelow. Retail unit 2 is the combination of payment unit 8 and point of sale 10.

Figure 2:
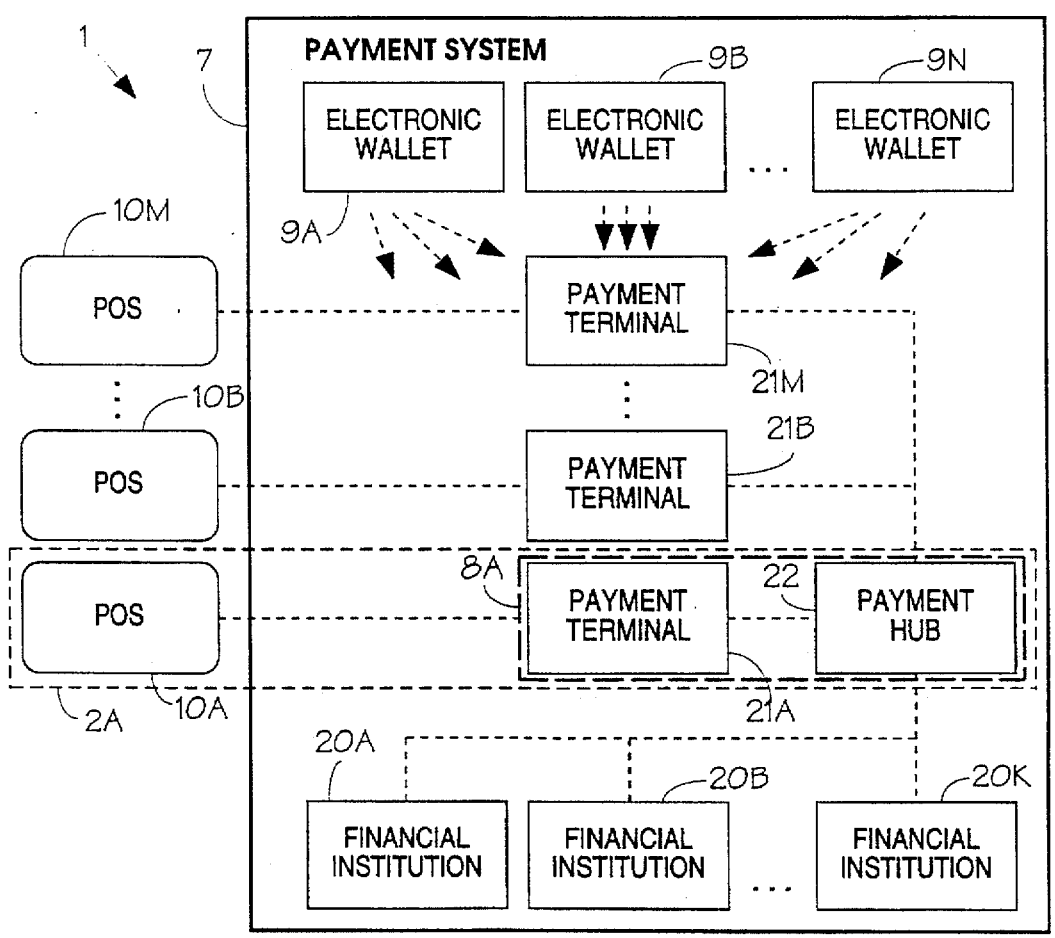
FIG. 2 is a schematic block diagram illustration of a variation of the retail unit of FIG. 1.

Reference is made to FIG. 2, which describes a variation of the preferred embodiment of FIG. 1. In this embodiment, a payment unit 8A is divided into a payment terminal 21A and a payment hub 22. The payment hub being common to a plurality of payment terminals 21A–21M. In the illustrated embodiment, a plurality of POS, of which three referenced 10A, 10B and 10M are shown, interface with a plurality of corresponding payment terminals, referenced 21A, 21B and 21M. In a representative payment unit 8A, the payment terminal 21A communicates with the respective POS 10A and interfaces with electronic wallets 9A–9N, while the payment hub 22 executes the transactions and communicates, as needed, with processing centers of financial institutions 20A–20K, as described in detail with reference to FIG. 4 below.

Each one of payment terminals 21A–21M effectively forms with payment hub 22 a payment unit 8A–8M, as schematically illustrated by the payment unit referenced 8A, which is functionally and structurally equivalent to payment unit 8 of FIG. 1. Thus, unless otherwise noted, the preferred embodiments of the present invention described hereinbelow with respect to a payment unit cover both the variations of FIG. 1 and FIG. 2. Similarly, each of retail units 2A–2M of FIG. 2, formed by combining any one of POS 10A–10M with the respective payment terminal 21A–21M and payment hub 22 (only 2A is shown), is equivalent to retail unit 2 of FIG. 1, thus, unless otherwise noted, the preferred embodiments of the present invention described hereinbelow with respect to a retail unit cover both the variations of FIG. 1 and FIG. 2.

Figure 3:
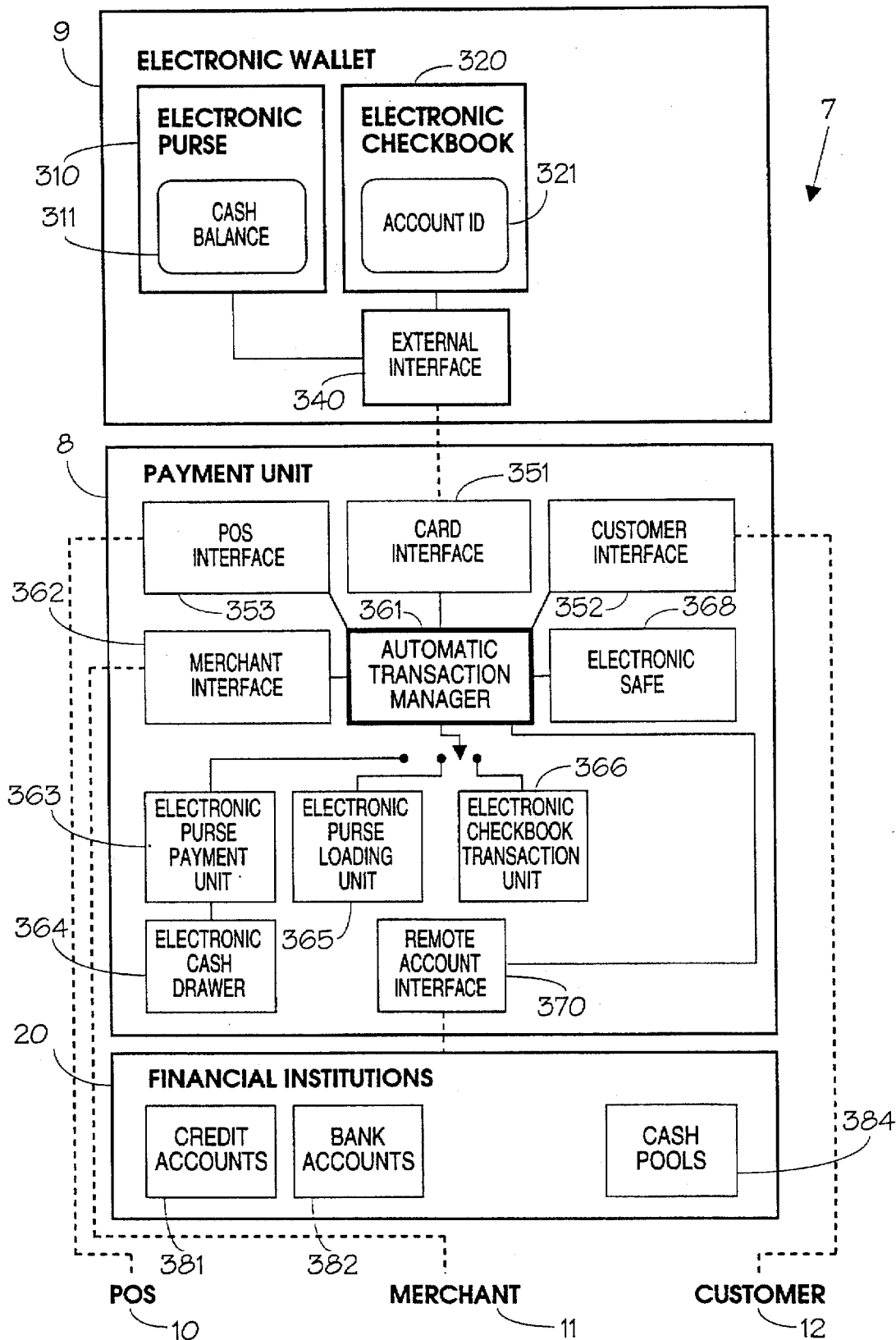
FIG. 3 is a schematic block diagram illustration of a payment system, constructed according to a preferred embodiment of the present invention.

Reference is made to FIG. 3 which is a detailed block diagram illustration of the payment system 7. Electronic wallet 9 which is personal to a customer 12 who is making a purchase at POS 10, comprises an electronic purse 310 containing information identifying the amount of electronic cash stored in its register 311. The electronic wallet also comprises an electronic checkbook 320, in which register 321 contains information identifying and authorizing transactions with at least one credit or bank account, made through processing centers of financial institutions 20. External interface 340 serves as an interface between the electronic wallet and payment units 8. External interface 340 comprises communication hardware as well as secured protocols for reading or altering the information stored in the electronic wallet. These protocols preferably include a requirement for keying-in a secret PIN (personal identification number) code via customer interface 352, as a precondition for any transaction with wallet 9.

Payment unit 8 comprises an automatic transaction manager 361, which controls all transactions executed with respect to electronic wallet 9.

Automatic transaction manager unit 361 selects and controls the operation of three transaction units: an electronic purse payment unit 363, electronic purse loading unit 365 and an electronic checkbook transaction unit 366. For each payment request received from POS 10 through POS interface 353, automatic transaction manager unit 361 selects the transaction or transactions to be executed and accordingly selects which of the units 363, 365 and 366 to activate.

Electronic purse payment unit 363 communicates with electronic purse 310 of electronic wallet 9. When unit 363 is activated to pay a purchase sum required by POS 10, it operates to reduce the amount of electronic cash stored in register 311 by the purchase sum, while increasing the amount of electronic cash stored in an electronic cash drawer 364 by the same sum.

The electronic cash accumulated in electronic cash drawer 364 can be transformed into money by settlement with cash pool units 384 of processing centers of suitable financial institutions, referenced collectively 20. Usually, this money will be deposited in a bank account of the merchant 11.

Electronic checkbook payment unit 366 operates to transfer a specified sum from a customer's account in financial institution 20 corresponding to customer's electronic checkbook 320, either to the merchant's account when checkbook payment is executed, or to cash pool 384 for purchasing electronic cash for purse replenishment. POS interface 353 is operative to receive payment requests from POS 10 and return payment acknowledgements upon payment completion.

Electronic purse loading unit 365 is capable of loading electronic cash into electronic purse 310, typically upon purchasing the electronic cash by the electronic checkbook 320 from a cash pool 384 during a purse replenishment transaction.

Card interface 351 includes hardware and protocols known in the art for secured communication with electronic wallet 9. It may include mechanical means operative to retain an electronic wallet during transaction and to release it upon the transaction completion. It may use contactless communication or even allow remote transactions by using a suitable communication means. For example, a wireless communication link may serve to collect payment in a toll road without stopping the car, or for collecting payment for a card used with a cellular telephone.

As an optional feature, payment unit 8 may include a customer interface 352, for example a keypad and a display, operative to display status information and to allow adding a Personal Identification Number (PIN). As is well known in the art, a PIN is a secret code which serves as an electronic signature to enhance transaction security. If more than one central account is accessible by electronic checkbook 320, the customer may use customer interface 352 to select the account to be charged.

Merchant interface 362 may be any communication link which enables the owner and/or operator of the retail system of which payment unit 8 is part of to enter operation parameters into automatic transaction manager 361, for example the minimal electronic checkbook payment sum. A non limiting example is that of a communication link to the merchant's office computer.

Remote account interface 370 incorporates hardware and protocols known in the art for secured communication with transaction processing centers of financial institutions 20, respective to the accounts identified by register 321 of electronic checkbooks 320 included in the customers' electronic wallets 9. The communication can be either on line or off-line. Non limiting examples of on-line communication means include dial-up telephone lines, dedicated lines or cellular data communication. A non limiting example of off-line communication means is a handheld terminal for unloading transaction information from payment unit 8 when visiting them, and downloading the information thereafter to processing centers of financial institutions 20 by communicating with them from the merchant's office. These handheld terminals may work the other way, i.e. unloading information from the financial institutions thereinto at the merchant's office and downloading this information into payment units 8 during a visit.

Electronic safe 368 is an electronic storage device for temporary electronic storage of central transactions executed in an off-line communication. Transaction orders are stored in the electronic safe 368 until they are downloaded for batch processing during a communication session with the transaction processing centers of financial institutions 20.

Each of the transaction processing centers of financial institutions 20 comprises customers' credit and/or bank accounts referenced 381 and 382 and a cash pool 384. Customers' credit and/or bank accounts 381 and 382 correspond to electronic checkbooks, such as the electronic checkbook 320, are charged for payment transactions wherein the charged amount is transferred to a bank account (not shown) of the merchant 11. Accounts 381 and 382 are also charged for purse replenishment transactions wherein the charged amount is transformed into electronic cash by cash pool 384 and transferred electronically to the electronic purse 310.

Cash pool 384 is an accounting unit for transforming money paid by electronic checkbooks 320 into electronic cash loaded into electronic purse 310, and for transforming electronic cash received from electronic purse 310 or from electronic cash drawers 364 into cash deposited to the merchant's bank account. Cash pool unit 384 includes the protocols known in the art for transferring electronic cash to electronic purse 310 and from electronic cash drawer 364.

Electronic cash drawer 364 and electronic safe 368 are preferably secured by hardware design and protocols similar to those used in smart cards, to prevent unauthorized access to the information stored therein.

Figure 4:
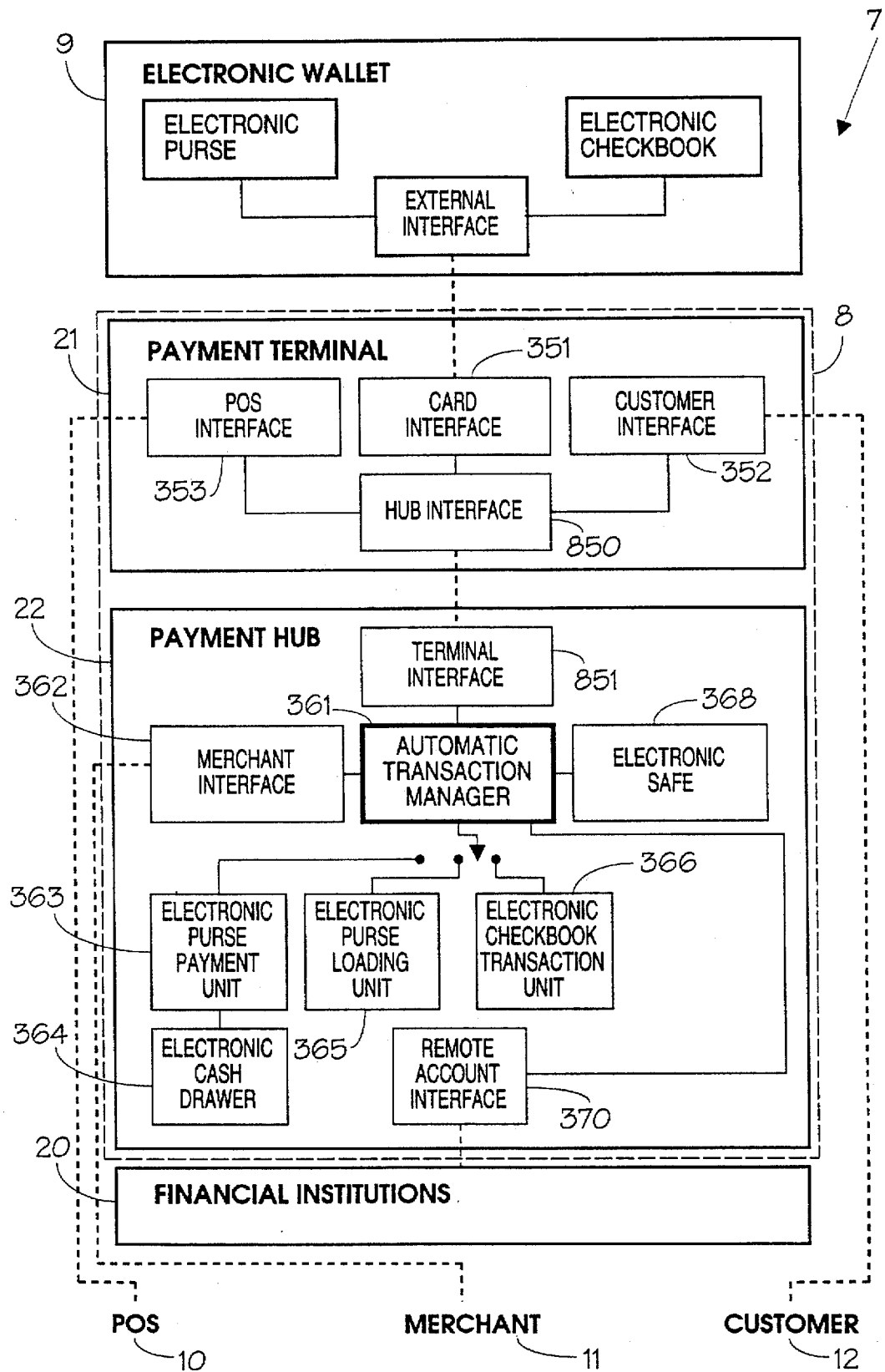
FIG. 4 is a schematic block diagram illustration of a variation of the payment system of FIG. 3.

Reference is made to FIG. 4 which illustrates a variation of the payment system of FIG. 3, modified according to the retail system of FIG. 2, compared to the system of FIG. 1. Payment unit 8 of FIG. 4 is divided into a payment terminal 21 and a payment hub 22, interfacing through hub interface 850 and terminal interface 851. All elements of payment unit 8 of FIG. 4 are similar in their function and construction to those of FIG. 3, except the automatic transaction manager which operates with a plurality of payment terminals 21 through terminal interface 851. However, the blocks are distributed between payment terminal 21 which includes the POS interface 353, the card interface 351 and optionally the customer interface 352, and payment hub 22 which includes automatic transaction manager 361, merchant interface 362, electronic safe 368, electronic purse payment unit 363, electronic purse loading unit 365, electronic checkbook transaction unit 366, electronic cash drawer 364, and remote account interface 370.

Figure 5:
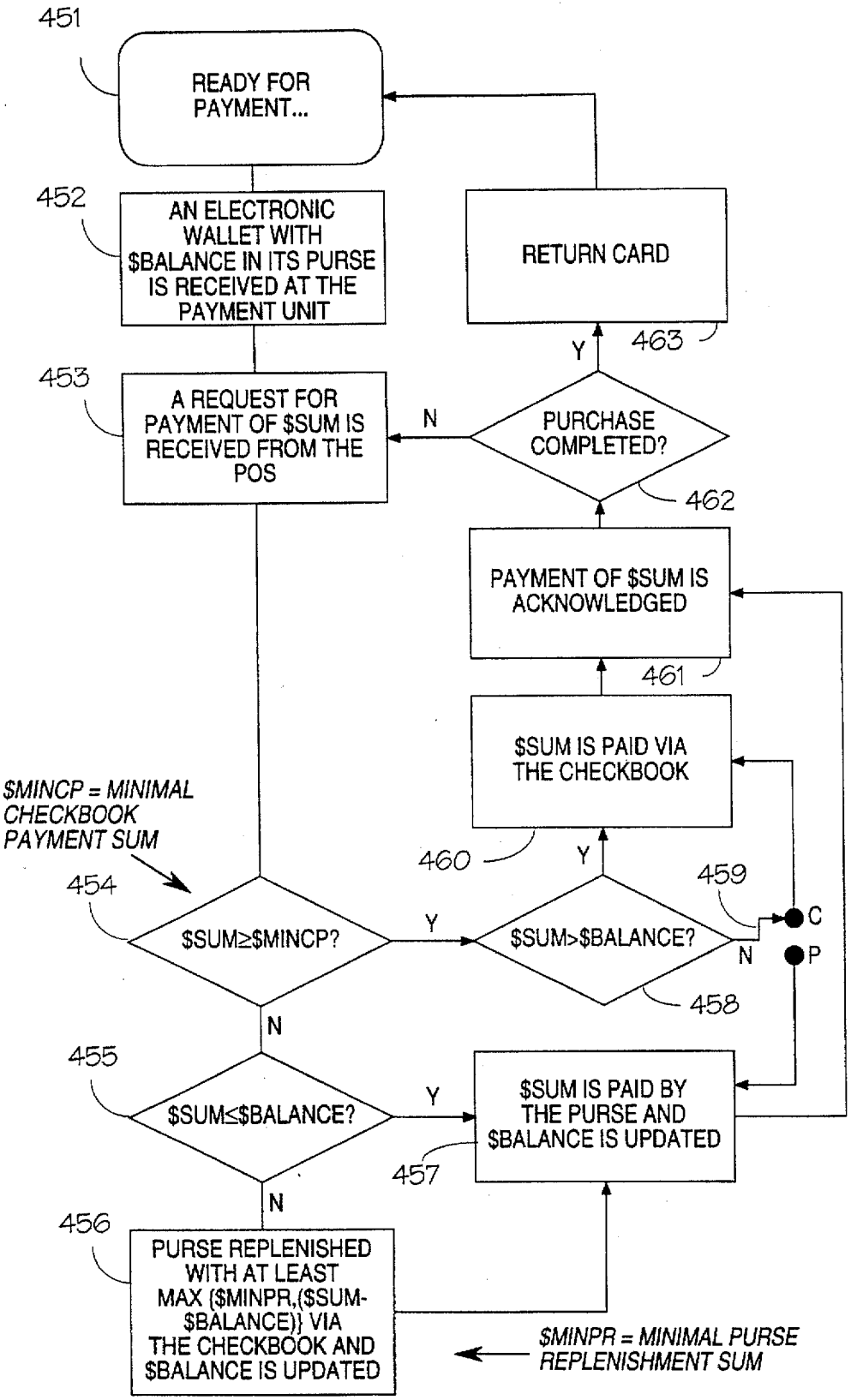
FIG. 5 is a schematic flow chart illustration of the operation of the payment system of FIG. 3.

Reference is made now also to FIG. 5 which illustrates a preferred method of operating the automatic transaction manager 361 of FIGS. 3 and 4. Block 451 indicates the idle state of the payment system 7, ready for starting a transaction. In block 452 an electronic wallet 9 with a sum of $BALANCE of electronic cash stored in register 311 is received, and the customer is preferably prompted to key-in his PIN code through customer interface 352. In block 453 a request for payment of $SUM is received from POS 10 through POS interface 353.

In block 454 $SUM is compared to the minimal checkbook payment transaction sum referenced $MINCP in order to determine whether checkbook payment is feasible. If the answer is positive then, as indicated in block 458, $SUM is compared with $BALANCE to determine whether a purse transaction is feasible as well. If the electronic purse transaction is not feasible then the transaction is directed to the checkbook transaction unit 366 as indicated by block 460.

If both checkbook and purse payment transactions are feasible, the transaction can be executed either way so a logical switch 459 is provided to direct the transaction either to the checkbook transaction unit 366 as indicated by block 460 or the purse payment unit 363 as indicated by block 457. The switch setting in 459 to either C or P position is either predetermined by the merchant 11 through the merchant interface 362, or is made selectable by the customer during purchase through customer interface 352.

If the answer in 454 is negative, i.e. the payment has been found unfeasible for checkbook payment, it is checked for purse payment feasibility as indicated in block 455. In block 457 the payment is found feasible through the purse, i.e. $SUM is smaller or equal to $BALANCE, and therefore payment is executed through purse payment unit 363.

However, if $SUM is larger than $BALANCE, the electronic purse must be replenished to enable payment. As indicated by block 456, the electronic purse 310 is replenished via the electronic checkbook 320 through units 366 and 365 with at least the larger of the minimal purse replenishment sum referenced $MINPR and $SUM minus $BALANCE, i.e. the sum necessary for sufficient payment. Only then purse payment is executed in 457 through unit 363.

It will be appreciated that instead of accessing the electronic purse twice, for replenishment of a replenishment sum calculated in block 456 and for purse payment of $SUM by block 457, the purse can be accessed only once, for loading thereto, by unit 365, the difference between the replenishment sum and $SUM, or for collecting therefrom this value by unit 363, if this difference is negative. Both modes are mathematically and functionally equivalent, except for a special case described with reference to FIG. 10A below.

The minimal checkbook payment sum $MINCP and the minimal purse replenishment sum $MINPR are parameters predefined by the merchant and/or financial institutions to avoid the cost of central transactions for low value transactions.

It will be appreciated that customer interface 352 may indicate at step 456 the amount necessary for replenishment and allow the customer to select a sum larger than this amount, e.g. for increasing the amount of electronic cash in his electronic wallet for future use.

When payment is completed, either in 457 or 460, the payment of $SUM is acknowledged to POS 10 as indicated by block 461. In Block 462 an indication is received from POS 10 as to whether the purchase is completed. Non limiting examples for purchase completion follow hereinbelow. If POS 10 is a supermarket cash register, purchase is completed upon payment. If POS 10 is a public telephone, purchase will be completed only upon hang up and may include a number of intermediate payments.

If purchase has not been completed in 462, then in 453 the payment system is awaiting the next payment request from the POS. If purchase is completed in 462, the card is returned to the customer in 463 by card interface 351, and payment system 7 returns to its idle state 451, ready to serve another customer.

It would be appreciated that since any sum between zero and the maximal sum chargeable to the electronic wallet via its electronic checkbook is payable with the payment system described hereinabove, the failure and interruption deficiencies of the prior art electronic wallet payment systems are overcome by the present invention.

Figure 6:
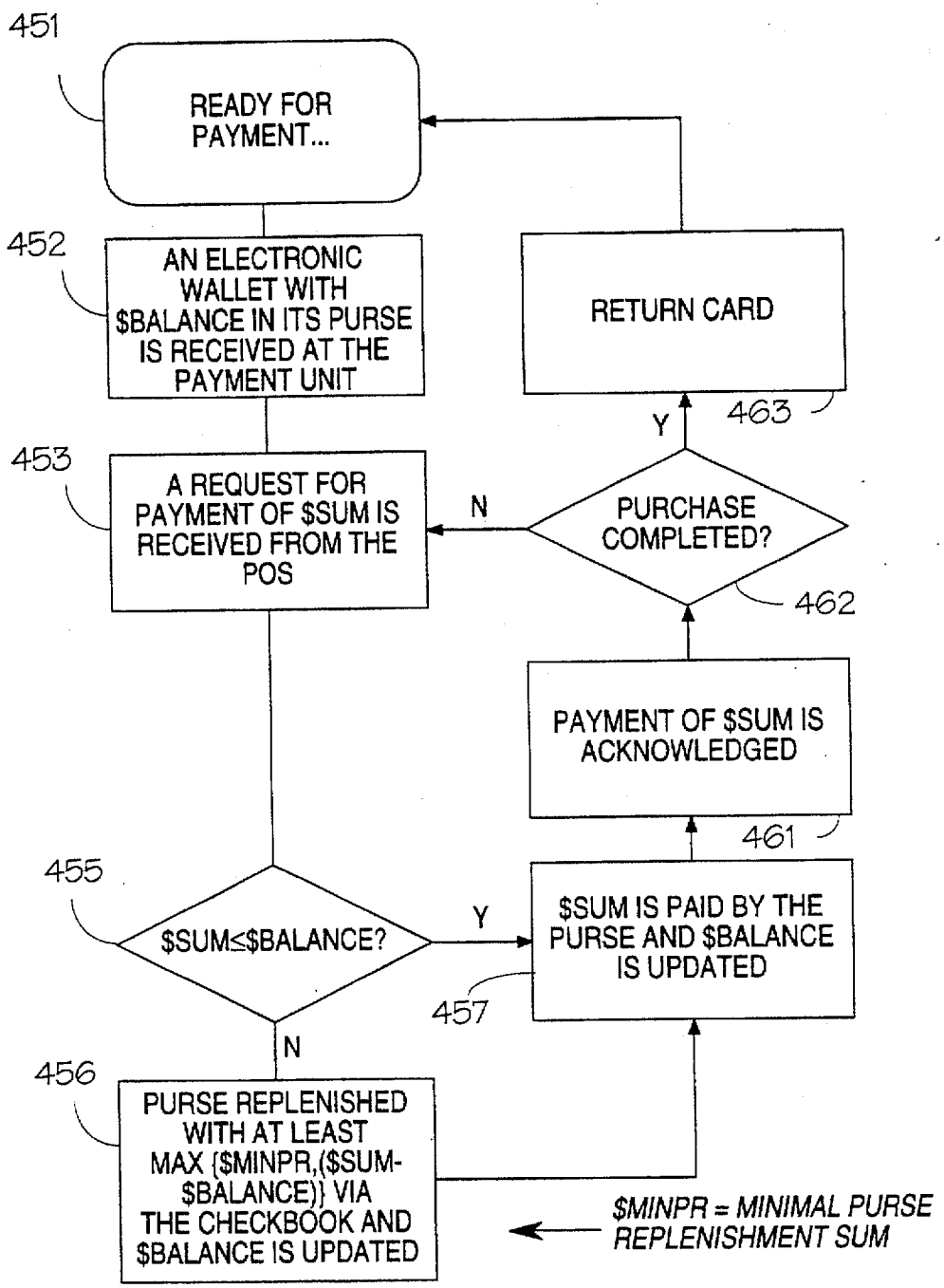
FIG. 6 is a schematic block diagram illustration of a variation of the operation of FIG. 5.

Reference is made now also to FIG. 6 which illustrates a variation of the payment procedure of FIG. 5, in the case where the minimal checkbook payment sum $MINCP is higher than the maximal possible payment sum $SUM for any single payment transactions. Such situations are typical, for example, to common vending machines or public telephone calls, or $MINCP can be set intentionally to a high value by a merchant wishing to avoid paying credit card transaction fees, provided that purse replenishment fees are paid by the customer. In such circumstances blocks 454, 458, 459 and 460 of FIG. 5 can be eliminated, thus yielding the simplified procedure of FIG. 6.

In 451, the payment unit is in its idle state, ready to receive an electronic wallet 9 with $BALANCE in its purse as indicated in block 452. In block 453 a request for payment of $SUM is received, and in 455 a check is made to determine whether payment can be made from the present purse balance. If the answer is positive, payment is made from the purse in 457. If the current balance is found insufficient in 455, then it is first replenished with a sufficient sum in 456 or with a larger desired sum specified by the customer, and then the purse is charged in 457. In 461 payment is acknowledged to the POS, and in 462, purchase is either completed, followed by card return in 463, or is continued in 453.

It will be appreciated that FIG. 5 presents a more general case than FIG. 6, and that the procedure of FIG. 6 can always be attained by using the procedure of FIG. 5 and setting $MINCP to a value higher than any possible purchase price.

A Retail Unit for Free-Access Automatic Retail

Figure 7:
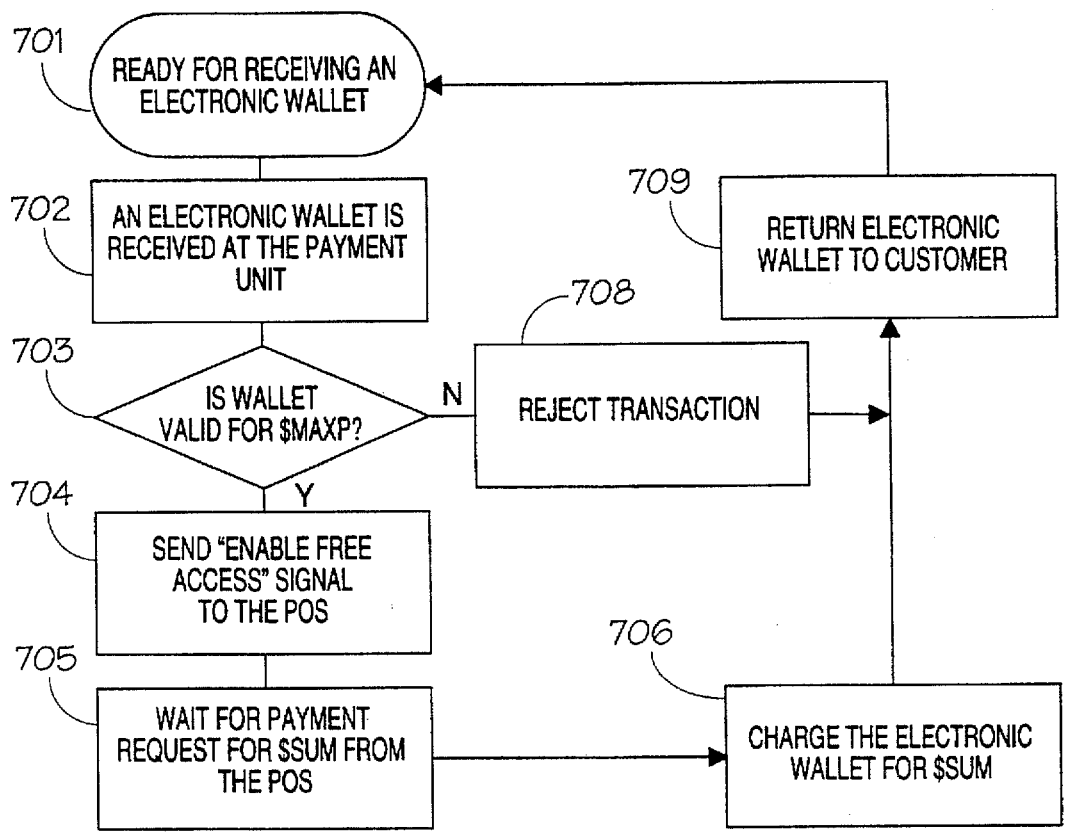
FIG. 7 is a schematic flow chart illustration of the operation of the payment system of FIG. 3 in single-pass, free-access automatic retail.
Figure 8:
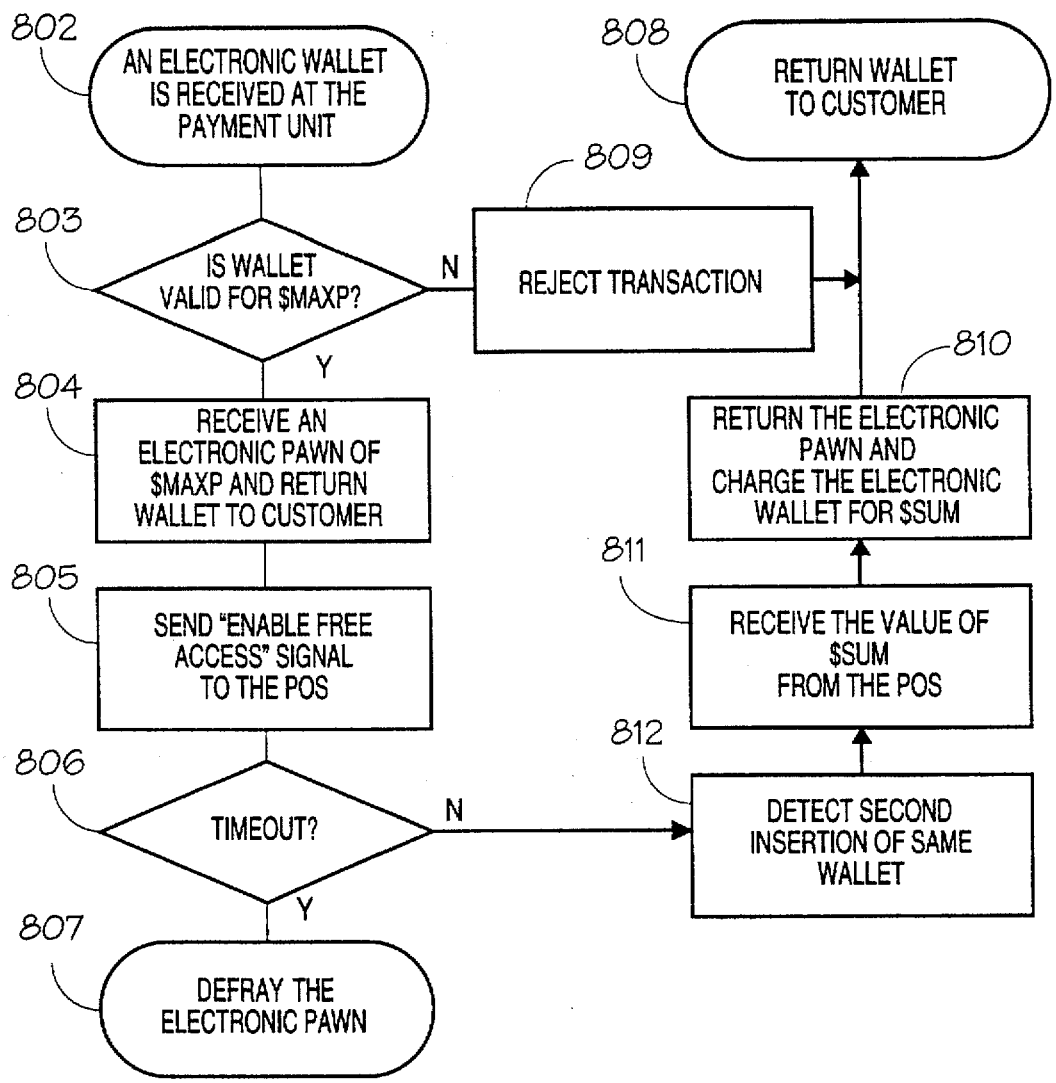
FIG. 8 is a schematic flow chart illustration of the payment system of FIG. 3 in dual-pass, free-access automatic retail.

Reference is now made to FIGS. 7, 4 and 8 which illustrate the operation of a free-access automatic retail system, constructed according to the present invention. Non-limiting examples of free-access automatic retail systems are a free-access vending machine, such as the one described in a co-pending PCT Patent Application PCT/US/06882 to the present inventor, a parking meter or the gates of an automatic parking garage wherein the customer alone determines the parking time- of his car, automatic entrance and exit turnstiles in a subway where the customer pays according to the distance he actually travels, or a similar situation on a toll road.

According to the present invention, in a free-access automatic retail system, the POS controls the enabling of a customer's free-access to an accessible inventory of merchandise items, which may include goods and/or services. When free-access to the inventory is enabled, the customer may remove or consume any number of items within the inventory, while the POS is monitoring the removal or consumption of items. Upon purchase completion, the POS bars the free-access and calculates the purchase price to be paid for at the respective payment unit.

In a single-pass free-access automatic retail system the electronic wallet is retained within the payment unit throughout the purchase, thus the electronic wallet is presented once at a payment unit. In a dual-pass retail system the electronic wallet is presented twice, at the beginning of purchase for enabling free-access, and at the end of purchase for completing the payment.

FIG. 7 describes the operation of a single-pass free-access automatic retail system and FIGS. 4 and 8 describe a preferred payment system and its operation, respectively, of a dual-pass free-access automatic retail system.

Reference is made to FIG. 7, which describes the operation of payment unit 8 (of FIG. 3 or FIG. 4) for a single-pass free-access automatic retail system.

According to the present invention, the operation of a single-pass free-access automatic retail system includes a first step of validating that the electronic wallet can be charged for the value of the entire accessible inventory prior to the POS enabling free-access to the accessible inventory, and a second step of payment for the actual purchase as determined by the POS upon barring the access to the accessible inventory.

The payment system is ready to receive an electronic wallet 9 at 701. At 702 an electronic wallet is received at card interface 351 of payment unit 8 (FIG. 3 or FIG. 4) and is retained therein. At 703 checkbook transaction unit 366 is actuated by automatic transaction manager 361, to check the validity of the electronic wallet for payment of $MAXP, a parameter received from POS 10 through POS interface 353 representing the value of the entire accessible inventory offered through POS 10.

The advance validity check indicated by block 703 must be of a very low cost, since the validity check is part of each and every transaction, even if the final payment is of a very small sum. The advance validity check in block 703 may include practices common in the prior art for low-cost, off-line validation, such as checking the PIN code and/or looking in red lists of cancelled cards received during communication with financial institutions 20 and maintained in unit 366.

If an electronic wallet 9 is validated by the respective financial institution for a specified sum which is smaller than $MAXP, the merchant may wish to share some of the risk, and still approve the transaction. This risk sharing is also a common practice in the prior art. Thus, an advance validity check acceptable by the present invention will be considered as a procedure meeting the following criteria: a) $MAXP is chargeable to the electronic wallet; b) the validation procedure is approved by the respective financial institution (the electronic wallet issuer) which also takes responsibility for payment of at least a substantial part of $MAXP; c) in case the electronic wallet 9 issuer does not take responsibility for paying $MAXP in full, the merchant agrees to take the remainder of the risk; d) the transaction cost is small relative to the average payment. The present invention also provides improved means for off-line validity checks with higher security at lower costs, as will be described in reference to FIGS. 12–16G below.

If the validity check in 703 is negative, a transaction rejection signal is sent at 708 to POS 10 through POS interface 353, electronic wallet 9 is returned to the customer by card interface 351 accompanied by a message through customer interface 352, and the payment system is ready for receiving the next electronic wallet at 701. If the validity check in 703 is positive, an access-enable signal is sent to POS 10 at 704, and the customer gains free-access which enables him to remove or consume items of his choice.

Block 705 indicates that payment unit 8 awaits a payment request for $SUM from POS 10 received through POS interface 353 once the purchase is concluded and free-access is barred. At 706 the electronic wallet is charged for $SUM according to the payment procedure described with reference to FIG. 5.

It will be appreciated that since $SUM is always smaller than $MAXP, since payment for $MAXP has been validated in advance in 703, and since the payment procedure of FIG. 5 is failure-free, a failure-free execution of the payment of $SUM in 706 is guaranteed in advance. It will also be appreciated that this failure-free feature is mandatory for automatic retail, since predictable payment failures are not affordable to automatic retail as they represent a prohibitive loophole in their operation, calling for misuse.

Upon payment completion, the card is returned to the customer as indicated by block 709 by card interface 351, and the payment unit is ready in 701 for the next transaction.

In a dual-pass free-access automatic retail system, two interactions between the electronic wallet and the payment system are required, one at an entrance location to gain access to the accessible inventory and the second in an exit location to complete payment for the goods and/or services actually purchased. For example, in a parking garage, first insertion of an electronic wallet 9 is required at its entrance for opening a gate, and a second insertion of the same electronic wallet 9 is required upon exit for payment according to the actual parking time.

According to a preferred embodiment of the present invention the payment system used in a dual-pass free-access automatic retail system is that of the variation illustrated in FIG. 2 and in more detail in FIG. 4.

As shown in FIG. 2 with reference to the non limiting example of a parking garage, the controller of an entrance gate may be a first POS 10A interfacing with payment terminal 21A, while the controller of an exit gate may be a second POS 10B interfacing with payment terminal 21B.

It will be appreciated that since the interactions are at the beginning and at the end of a purchase, the customer can use the electronic wallet freely in-between for any desired related or non-related purchase.

As shown in FIG. 2 and 4, payment terminal 21A and 21B interface with electronic wallet 9 through card interface 351, with POS 10A and 10B through POS interface 353, with customer 12 through customer interface 352, and with payment hub 22 through hub interface 850. Payment hub 22 interfaces with payment terminal 21A and 21B through interface 851 and includes units and functions similar to those of payment unit 8 described hereinabove in reference to FIG. 5, with modified programming of automatic transaction manager 361 described with respect to FIG. 8.

As shown in FIG. 8, the operation of payment system 27 starts with step 802 as an electronic wallet is received at a payment terminal 21A, working in conjunction with POS 10A which is the controller of an entrance gate to the parking garage. In 803 the card is checked for validity for payment of $MAXP, wherein $MAXP is the maximal parking fee, e.g. equivalent to seven day parking. If the validity check is negative, the transaction is rejected at 809; the entrance gate remains closed and the customer is instructed, through customer interface 352, e.g. an illuminated sign, to leave the gate. The card is then returned to the customer in 808.

If the validity check is positive, an electronic pawn of $MAXP is charged. An electronic pawn refers herein to a reversible payment transaction whose transaction cost is relatively low. The electronic pawn enables to charge the customer if he does not present the electronic wallet 9 at payment terminal 21B of the exit location within a predetermined period of time.

The electronic pawn is drawn by payment unit 8. Preferably this is made by an off-line charge of $MAXP to the electronic wallet according to the procedure of FIG. 5 which may involve an electronic check payment which will be deposited in electronic safe 368, an electronic purse payment which will be deposited in electronic cash drawer 364, and an electronic purse replenishment order which will be deposited in electronic safe 368 and may result also in loading a sum to the electronic purse. These deposits are marked electronically as electronic deposits, including the deposit date and time and the identification of the electronic wallet (e.g. through identifying the incorporated electronic checkbook), and are not sent to settlement with transaction processing centers of financial institution 20 unless specifically instructed so by the automatic transaction manager 361, as will be described hereinbelow.

After the electronic pawn is received and the card is returned to the customer in 804, a signal is sent in 805 to the entrance POS 10A, for enabling free access, i.e. opening the entrance gate. In 806, the electronic safe 368 and electronic cash drawer 364 are occasionally scanned by automatic transaction manager 361 to identify pawns made prior to a specified time, say seven days ago. Such pawns are sent in 807 to be defrayed through remote account interface 370, i.e. an electronic wallet transaction for $MAXP is actually executed, paying the maximal parking fee, to complete the specific transaction.

If the customer reaches an exit location of the parking garage, preferably the exit allowing one-way passage thus barring the free access upon passage, he has an option to stop at an exit POS 10B operative with a payment terminal 21B, wherein at 812 he inserts to card interface 351 the same electronic wallet used for entrance. When an electronic wallet is received at the exit payment terminal 21B at 812, its electronic checkbook is checked to identify the corresponding pawn stored at electronic safe 368 and/or electronic cash drawer 364 of payment hub 22. At 811 the pawn deposit time, which is substantially similar to the entrance time, is reported to POS 10B, which calculates accordingly the parking fee $SUM and returns its value to automatic transaction manager 361 of the payment hub through payment terminal 21B. In 810 automatic transaction manager 361 returns the electronic pawn by reversing the pawn payment procedure in 804, i.e. cancelling electronic checks or replenishment orders retained in electronic safe 368, and adding to or debiting cash from the electronic purse; if the purse balance in the electronic purse is insufficient for the reversal, i.e. as a result of using the purse after the pawn has been made, the purse charge is added to the payment sum, thus increasing the value of $SUM. Finally, a payment transaction of $SUM is executed according to steps 453–461 of FIG. 5. The customer retrieves his card in 808 and leaves the parking garage.

It will be appreciated that in the example above, instead of using separate retail units for entrance and exit, a single retail unit can serve both, if both entrance and exit are practically controllable by a single POS and the same payment unit can be accessed at both.

It will be appreciated that the retail unit according to the present invention has been shown to operate effectively with both single-pass and dual-pass free-access automatic retail, which are important objects of the present invention.

Closed and Open Architectures Reference is now made to FIGS. 9A, 9B, 9C and 10 which illustrate various architectures of the payment system 7 of FIG. 3 or FIG. 4.

Figure 9A:
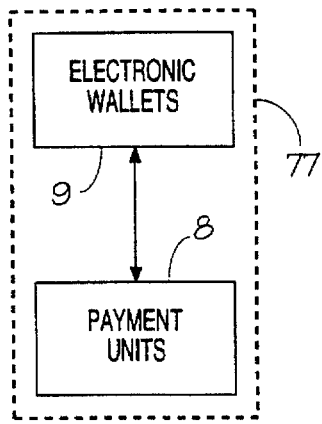
FIGS. 9A–9C are schematic block diagram illustrations of closed, open and partly-open architecture operation modes of the payment systems of the present invention.

FIG. 9A illustrates a payment system having a closed architecture. As shown by the part of the payment system 7 referenced 77, this part excludes the transaction processing centers of financial institutions, a pre-defined group of electronic wallets 9 can be used for payment only with a pre-defined group of payment units 8, and the predefined group of payment units 8 receive payment only from the predefined group of electronic wallets 9.

Figure 9B:
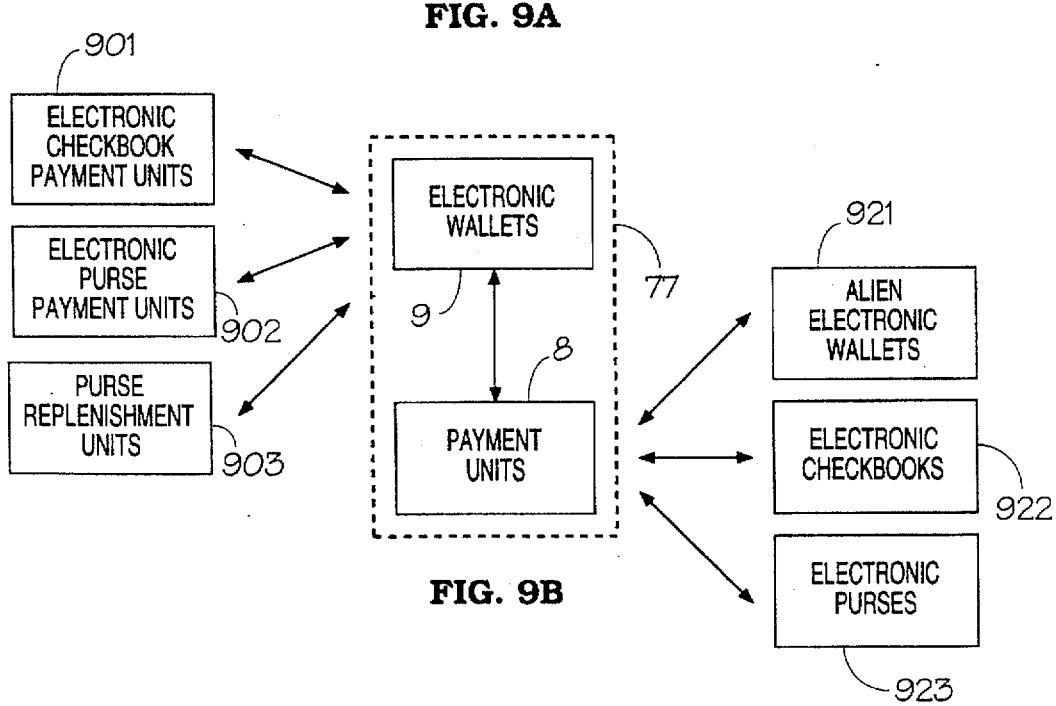

FIG. 9B illustrates a payment system having an open architecture. A payment system having open architecture enables, in addition to the transactions shown with respect to FIG. 9A, the electronic wallets 9 to pay in independent "alien" electronic checkbook transaction units 901 or electronic purse payment units 902 and can be replenished in replenishment devices 903. On the other hand, the payment units 8 can be used for receiving payment from other electronic checkbooks 922, electronic purses 923 and alien electronic wallets 921 which are not suitable for automatic transactions according to the present invention.

Figure 9C:
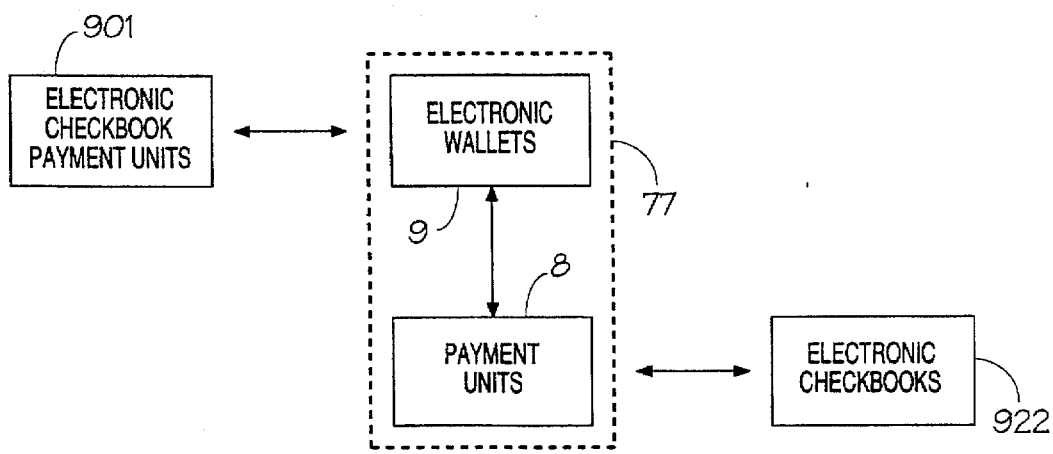

FIG. 9C illustrates a non limiting example of a payment system having a partly-open architecture, wherein only a subset of the transactions are open. In this example, the system is open both ways for electronic checkbook transactions, while being closed both ways to electronic purse transactions. Other variations are obviously possible as well.

It would be appreciated that alien cards, i.e. cards which are not suitable for the automatic transactions of the present invention do not guarantee failure-free payment, and are therefore unsuitable for free-access automatic retail. However, alien cards can be used in controlled-supply automatic retail as well as with manual retail, with performance similar to that of conventional payment systems of the prior art.

It would also be appreciated that the electronic wallets of the present invention can be used with alien payment units and replenishment terminals. Thus, the present invention supports open architectures, offering flexibility and convenience. However, there are some unexpected advantages of the closed architecture, as will be described with respect to FIG. 10 and 11A–C below.

Figure 10:
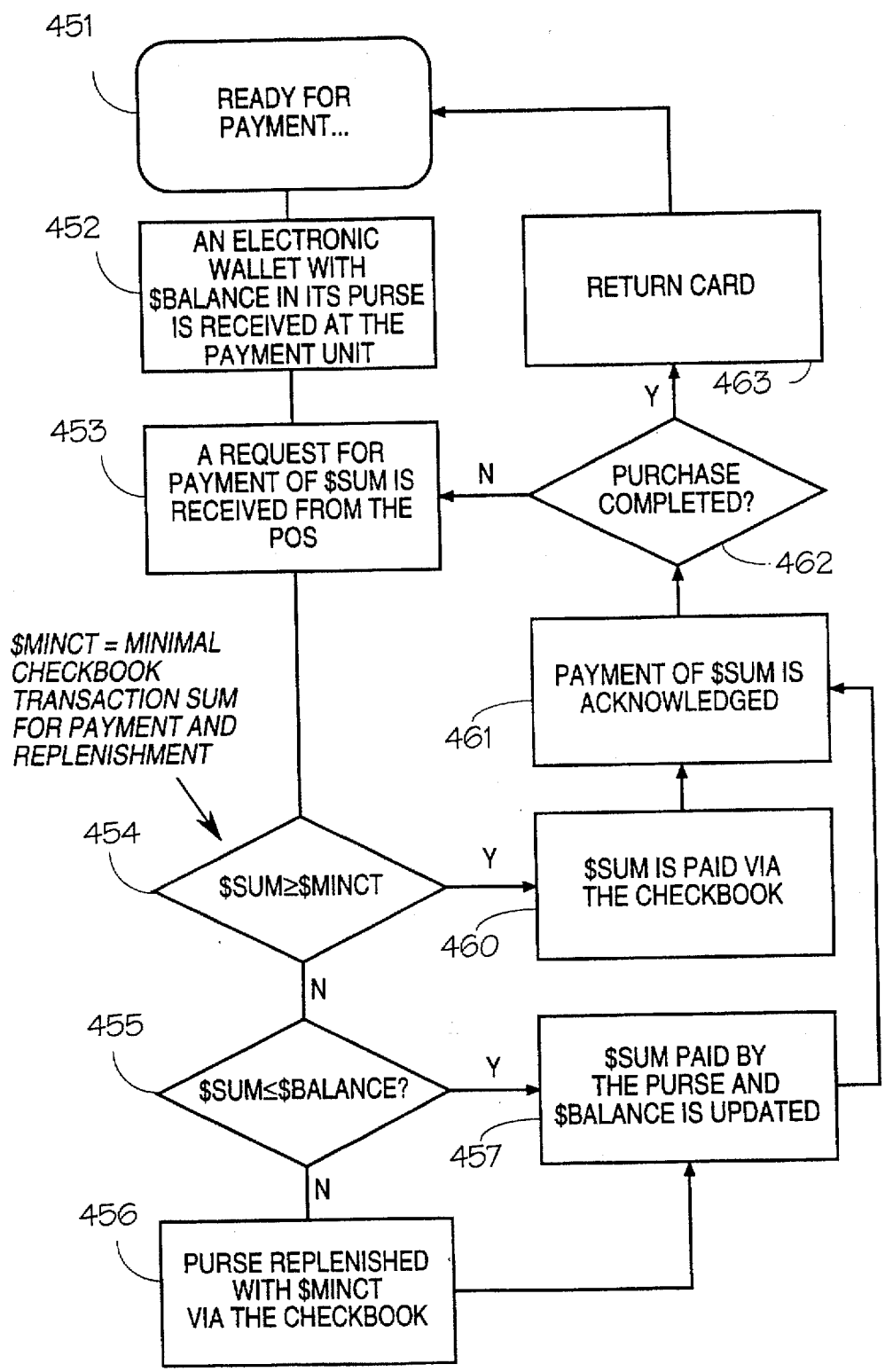
FIG. 10 is a schematic flow chart illustration of the operation of a variation of the payment systems of the present invention which is advantageous in the operation modes of FIG. 9A.

FIG. 10 relates to the payment procedure of FIG. 5, adapted to a payment system having a closed architecture as illustrated in FIG. 9A. To further simplify the system, the values of $MINCP and $MINPR, i.e. the minimal sums required when using a checkbook for payment and for purse replenishment respectively, are assumed equal and the common value is designated $MINCT—minimal checkbook transaction for both payment and purse replenishment. However, it will be appreciated that if all single payments are actually smaller than both $MINCP and $MINPR, then $MINCP becomes redundant (see FIG. 5), and then the value of $MINCT will be set equal to $MINPR, irrespective of the value of $MINCP.

In a payment system having a closed architecture, the customer does not need to maintain an excessive sum of electronic cash in his electronic wallet, because when using the wallet exclusively with payment units of the present invention, failure-free payment is guaranteed. The payment procedure of FIG. 10 starts with receiving an electronic wallet with $BALANCE in its purse in 452. When a request for payment of $SUM is received at 453, it is checked in 454 to find out whether it is payable via the checkbook, and if so, checkbook payment is executed in 460. It will be appreciated that if all payments are guaranteed to be below $MINCT, blocks 454 and 460 become redundant and can be eliminated from the procedure. If payment is too small for the checkbook, it is checked for purse payment in 455. If the purse balance is sufficient, the purse is charged for payment in 457. However, if the purse balance is insufficient, the purse is first replenished with $MINCT in 456 and then charged for $SUM in 457. In 462 the transaction is either completed and the card is returned in 463, or the card is ready for the next payment in 453, for instance for the next count of a public telephone.

It will be appreciated that after purse replenishment with $MINCT in 456, the payment transaction in 457 is guaranteed, as in 454 $SUM has already been found smaller than $MINCT.

It will also be appreciated that $BALANCE will never exceed $MINCT, as the only increase of $BALANCE occurs during the sequence of blocks 455, 456 and 457, wherein 455 ensures that $BALANCE<$SUM hence $BALANCE−$SUM<0, and step 456 followed by step 457 leave the purse with $BALANCE+$MINCT−$SUM= $MINCT+($BALANCE−$SUM)<$MINCT. Thus, in a payment system having a closed architecture and employing the procedure illustrated in FIG. 10, the electronic wallet will never contain a sum of electronic cash which exceeds the minimal checkbook transactions size, which is a relatively moderate sum. This minimizes the risk associated with loss of the electronic wallet, thus providing an improved payment system.

Other surprising aspects of payment systems having closed architecture and employing the procedure of FIG. 10 relate to the transaction statistics. Assuming a closed architecture and the transaction procedure of FIG. 10, it is reasonable to expect that the cash balances $BALANCE in electronic wallets received in the payment unit of the present invention, would be evenly distributed between zero and $MINCT. Thus, given a payment sum of $SUM, the probability that in a random electronic wallet $SUM<$BALANCE is approximately $SUM/$MINCT. Since in this case, a purse replenishment of $MINCT occurs by the procedure of FIG. 10, the expected value of the amount of purse replenishment at each random payment of $SUM is ($SUM/$MINCT)*$MINCT, which is $SUM. There are two very important practical consequences to this somewhat unexpected result:

(a) a replenishment transaction will occur, on average, at each time small transactions accumulate to $MINCT; for instance, $500 accumulated from under-$20 sales, where $20 is the minimal checkbook transaction size, will result in approximately 25 replenishment transactions (on average), irrespective of the small transaction sizes; this makes purse replenishment transactions equally acceptable to merchants selling $19 items and merchants selling 50¢ items;

(b) under the specified conditions, the total amount of electronic cash accumulated in the electronic cash drawer 364. (FIG. 3) (i.e. the total of $SUM values which are below $MINCT) equals on average the total amount accumulated in purse replenishment orders; this is a very important key for a viable off-line cash replenishment option, described in detail in respect to FIGS. 11A–C below.

Off-Line Purse Replenishment

Off-line purse replenishment is advantageous since it enhances the operability and reliability and reduce equipment and transaction costs involved in the retail procedures of the present invention. However, off-line purse replenishment out of the boundaries of a financial institution is commonly considered prohibitive, as it is analogous to granting a merchant a license "to print" money. Thus, on-line communication with a financial institution is considered mandatory in purse replenishment procedures of the prior art.

The present invention provides a system and method for off-line purse replenishment by supplying the required electronic cash from the merchant's electronic cash drawer 364 (FIGS. 3 and 4). Drawer-to-purse transactions are feasible using similar protocols to purse-to-drawer (i.e. purse payment) or purse-to-purse transactions known in the prior art. However, a sufficient sum of electronic cash must be maintained in the electronic cash drawer to ensure flawless operation. A high deposit of electronic cash at the electronic cash drawer may represent too-high investment and risk to the merchant since this electronic cash must be purchased from the financial institution and it can be lost if the payment unit is broken, burnt or stolen.

However, when using a payment system having a closed architecture (FIG. 9A) and the payment procedure of FIG. 10, the amount of electronic cash accumulated in the electronic cash drawer equals, on average, to the amount of electronic replenishment orders received for purse replenishment. This means that under these circumstances, a moderate initial cash deposit for compensating for statistical fluctuations, will suffice for flawless drawer-to-purse replenishment even during a high turnover of low-value payments.

Figure 11A:
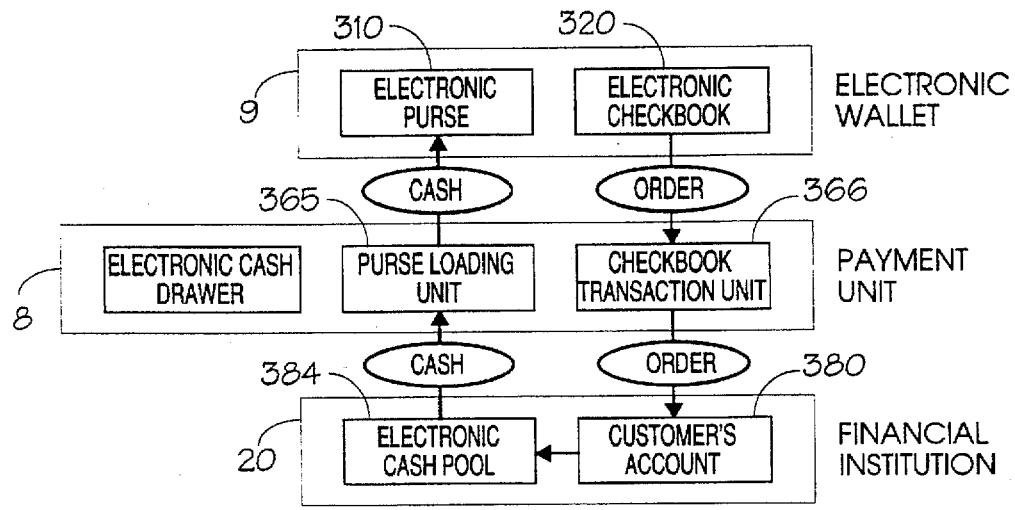
FIGS. 11A–11C are schematic block diagram illustrations of on-line and off-line replenishment procedures of the electronic wallet according to three preferred embodiments of the present invention.

FIG. 11A illustrates a conventional on-line purse replenishment procedure, wherein payment unit 8 relays an on-line replenishment transaction between electronic wallet 9 and processing center of financial institution 20. A replenishment order is sent from electronic checkbook 320 through electronic checkbook transaction unit 366 to processing center 20, where customer's account 380 is charged and a corresponding amount of cash is supplied to the electronic purse 310 from cash pool 384 trough purse loading unit 365.

Figure 11B:
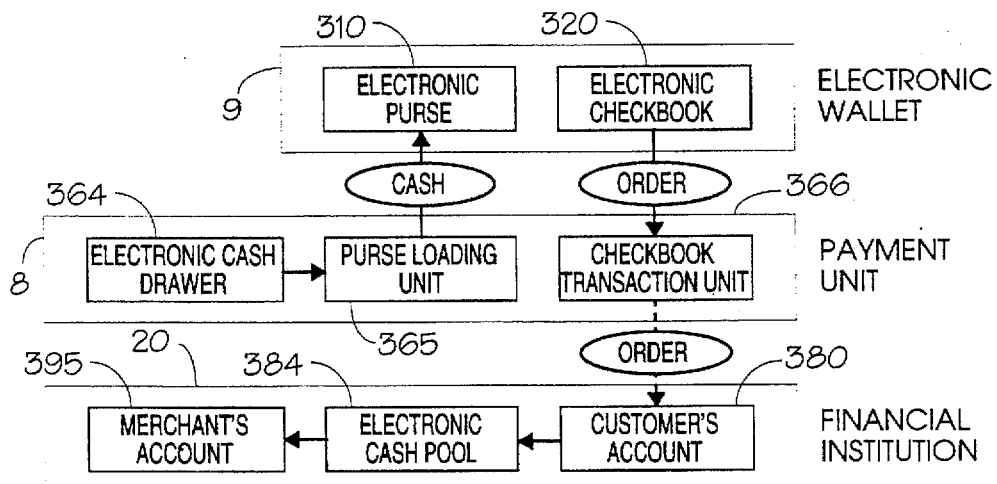

FIG. 11B illustrates a first preferred variation of off-line replenishment. The electronic checkbook issues a purse replenishment order to checkbook transaction unit 366. Unit 366 retains the order in the electronic safe 368 (FIG. 3) for further settlement, and the electronic cash drawer 364 supplies, from the electronic cash stored therein, a corresponding amount of cash to electronic purse 310 through purse loading unit 365. Subsequently, during communication between payment unit 8 and processing centers 20, the replenishment orders are transferred to the respective processing centers 20 respective to the replenishment orders retrieved by checkbook transaction unit 366 from the electronic safe 368. Each order charges a customer's account 380, is accounted for at the electronic cash pool 384, and an equivalent sum is finally transferred to the merchant's account 395.

Figure 11C:
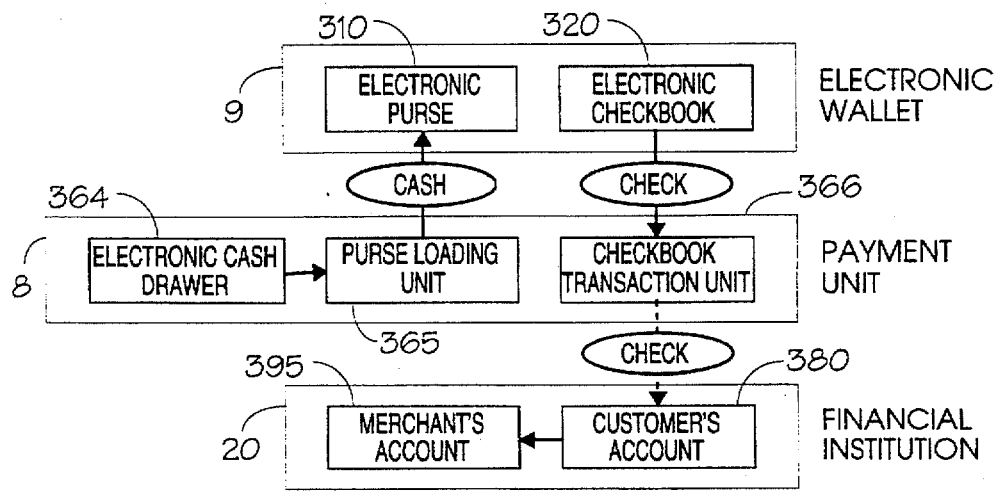

FIG. 11C illustrates a second preferred variation of off-line replenishment. It is similar to that of FIG. 11B, except that in this case the customer does not deposit a replenishment order but an electronic check payable to the merchant, i.e. a conventional electronic checkbook charge, to be retained in electronic safe 368. The merchant "cashes the check" by transferring electronic cash from his electronic cash drawer 364 to the customer's purse 310, and later-on he communicates with processing centers 380 and present these checks for settlement.

In spite of their similarity, the transactions of FIGS. 11B and 11C are different from the aspects of accounting and transaction fees, and choosing between them is a matter of merchant and customer preference. For example, usually the customer pays for replenishment transaction fees while the merchant pays for electronic checkbook settlement fees.

Using off-line replenishment by the method of either FIG. 11B or FIG. 11C with a dial-up communication option, preferably involves initiating communication in order to reload the electronic cash drawer with extra amount of electronic cash whenever statistical fluctuations cause its emptying. For example, when operating according to FIG. 10, the electronic cash drawer 364 can be reloaded with another 5 times $MINCT whenever the sum stored therein drops below 2 times $MINCT.

Using off-line replenishment in unconnected installations (i.e. with no dial-up option) may lead to failure and interruption whenever the cash drawer balance drops, as a result of statistical fluctuations, below the automatic replenishment value, e.g. $MINCT in the case of FIG. 10. In the case of free-access automatic retail, this will require setting the retail system to an "out-of-order" status whenever the sum in the electronic cash drawer falls below $MINCT. To avoid this, occasional priming of the electronic cash drawer with higher sums, e.g with 20 times $MINCT, will effectively minimize the occurrences of this potential status.

The operability of the drawer-to-purse replenishment methods of FIGS. 11B and 11C described by way of example hereinabove considering the statistics of a payment system having closed architecture using the operation procedure of FIG. 10. However, it would be appreciated that the drawer-to-purse replenishment procedures of FIG. 11B and 11C may also be applied in other cases, provided that the actual transaction statistics shows that the amount of electronic cash accumulated in the cash drawer approaches or exceeds, on average, the total cash amount needed for purse replenishment.

Figure 10A:
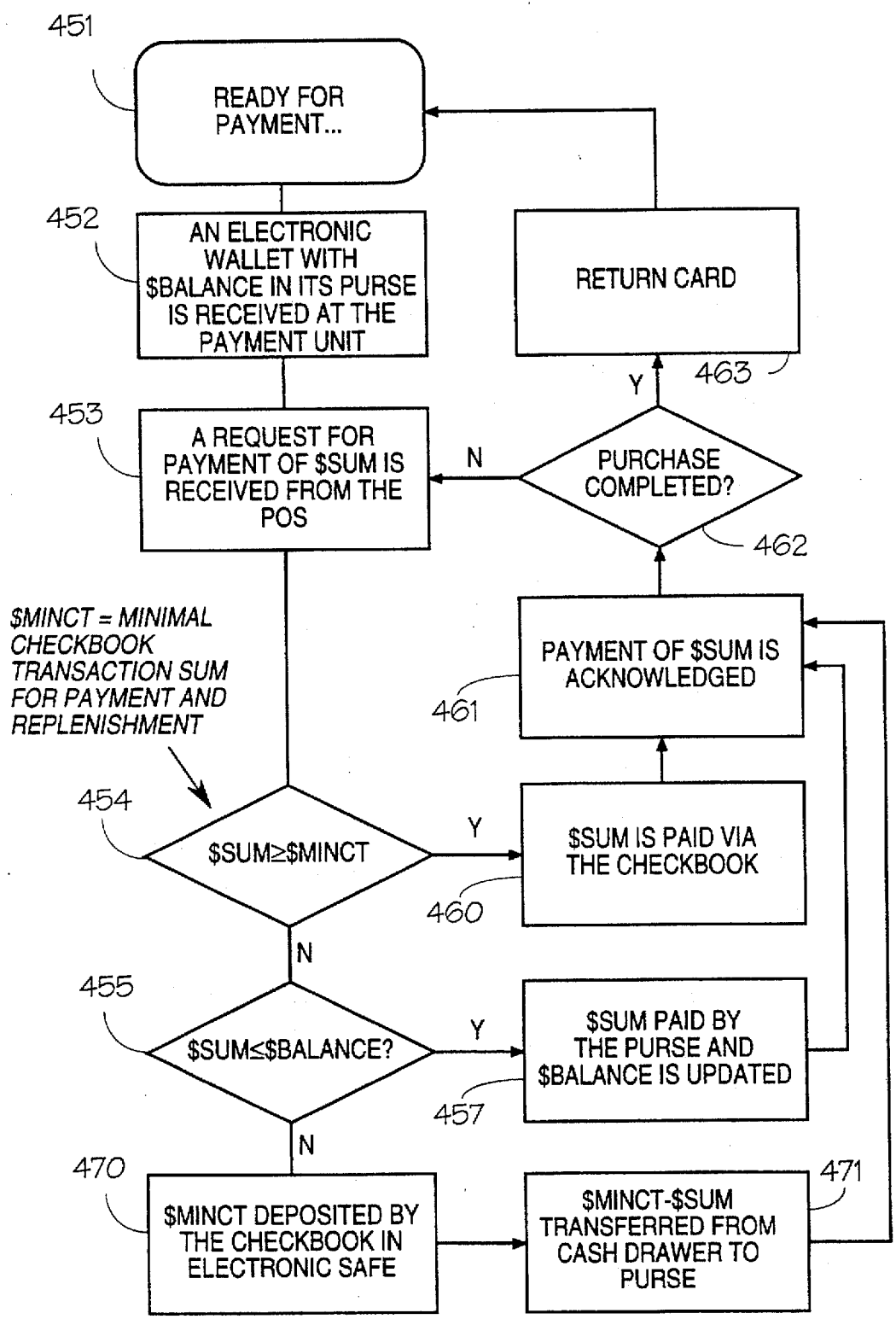
FIG. 10A is a variation of FIG. 10 with an advantage in off-line purse replenishment.

Reference is now made also to FIG. 10A which illustrates an exemplary preferred variation of off-line purse replenishment to that of FIG. 10. Considering a payment procedure, for example the one illustrated in FIG. 10, it will be appreciated that a purse replenishment transaction 456, when executed according to the procedures of either FIG. 11B or 11C, i.e. by transferring $MINCT from cash drawer 364 to electronic purse 310, followed by payment 457, i.e. transferring $SUM from electronic purse 310 to electronic cash drawer 364, can be replaced by transferring $MINCT minus $SUM from the electronic cash drawer to the electronic purse. While both variations are mathematically equivalent, the latter one is advantageous when the remaining balance in the electronic cash drawer is below $MINCT. In this case, the payment unit will fail in making a replenishment of $MINCT but may still work for transferring $MINCT minus $SUM from the electronic cash drawer to the electronic purse. Thus, FIG. 10A describes a preferred variation of FIG. 10 for off-line replenishment according to either FIG. 11B or FIG. 11C, wherein blocks 470 and 471 replace block 456 of FIG. 10. In block 470 an electronic replenishment order or an electronic check payable to the merchant (according to either of FIGS. 11B or 11C, respectively) is received from the electronic checkbook 320 and deposited in electronic safe 368 (FIG. 3). In block 471 $MINCT minus $SUM is transferred from electronic cash drawer 364 to electronic purse 310. The other blocks are the same as in FIG. 10.

Off-Line Checkbook Transactions

Off-line operability of the present invention is highly advantageous to enhance the reliability and reduce equipment and transaction costs. Off-line checkbook transactions with smart cards are considered satisfactorily safe, provided that the card bearer is considered trustworthy by the card issuer. This discriminates, by age and/or by lack of positive financial record, a substantial part of the population from receiving an electronic checkbook at all, or from receiving an electronic checkbook operable off-line. The preferred embodiment illustrated hereinbelow are directed to modifications to the payment system of the present invention, to allow substantially more liberal card distribution while retaining transaction security.

The present invention involves in its variations four types of electronic checkbook transactions: checkbook payments for higher-value purchases, purse replenishment orders, advance validation in case of single-pass free-access automatic retail and electronic pawn in case of dual-pass free-access automatic retail. It is an object of the present invention to provide an off-line option for these transactions, to minimize the costs of these transactions and to enhance the operability, reliability and efficiency of the present invention.

Figure 12:
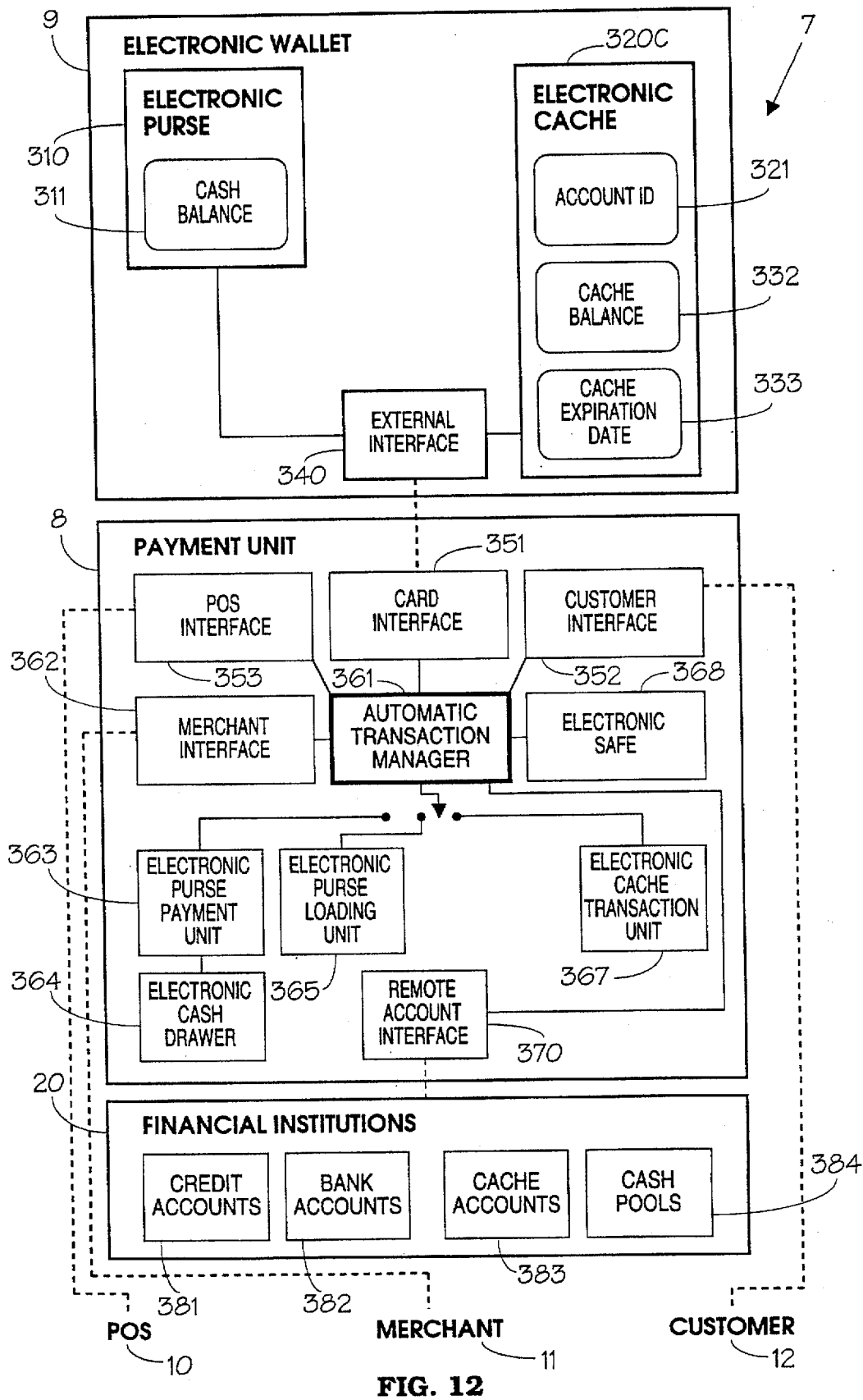
FIGS. 12–13 are schematic block diagram illustrations of a preferred embodiment of the present invention which is advantageous in off-line checkbook transactions.

Reference is made to FIG. 12, which introduces a payment system which is similar to that of FIG. 3, with the following modifications: electronic checkbook 320 is replaced by electronic cache 320C, electronic checkbook transaction unit 366 is replaced by electronic cache transaction unit 367, and cache accounts 383 are added to the arsenal of financial institutions 20. A cache account 383 is a special credit or bank account which is accessible for payment transactions only through a single respective electronic cache 320C. It is noted that conventional bank or credit accounts are accessible through a variety of means in addition to the respective electronic checkbook, such as paper checks, home banking computer or telephone orders. Preferably, one exception remains, i.e a claim for the value remaining in a cache account in case the corresponding electronic cache has been lost. It is also noted that adding value to a cache account 383 can be made also without presenting the corresponding electronic cache 320C.

Electronic cache 320C is a special, enhanced electronic checkbook. It issues electronic checks for account-to-account settlement in transaction processing centers of financial institution 20 similar to the electronic checks issued by the conventional electronic checkbook, but also manages on-card balance tracking similarly to the electronic purse. As described below, this combination provides highly secured off-line transactions with central accounts. Register 321 contains information identifying and authorizing transactions with the respective cache account 383. Register 332 maintains balance information regarding the sum accessible in cache account 383 through electronic cache 320C. Register 333 contains a cache expiration date information so that the electronic cache 320C will be unusable and rejected for payment after this date.

Electronic cache transaction unit 367 of payment unit 8 performs cache transactions by issuing electronic cache checks similarly to the operation of electronic checkbook transaction unit 366 (FIG. 3), while reducing the payment amount from the cache account balance register 332, using secured protocols similar to those used by electronic purse payment unit 363 during a purse payment transaction. The electronic cache check can be either settled on-line with the respective cache account in 383, or retained electronically is electronic safe 368 for settlement thereafter. Optionally, in the latter case the payment transaction can be reversed by deleting the cache check information from electronic safe 368 and increasing the value in account balance register 332 by the cancelled cache check sum. It would be appreciated that this procedure, which adds effective value to electronic cache 320C, requires secured protocols similar to those of drawer-to-purse transfer of electronic cash described above with respect to FIGS. 11B and 11C.

Figure 13:
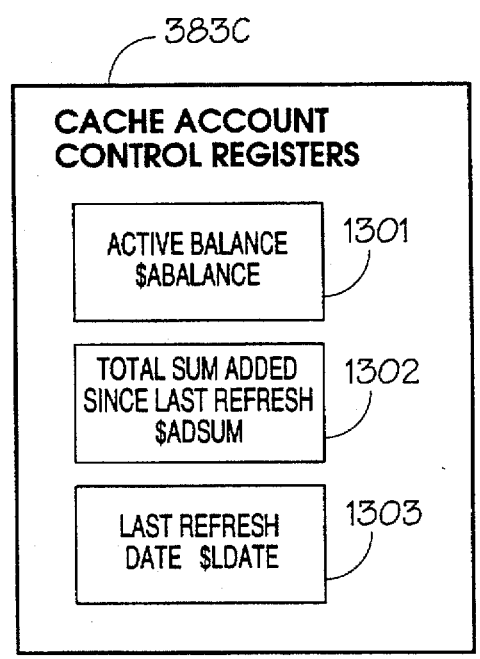

FIG. 13 illustrates a control register 383C included in each cache account 383 maintained in a financial institution 20. 1301 traces the active balance, designated $ABALANCE, which is the effective limit of the respective cache account. It is updated only during on-line cache refresh transactions, described below in respect to FIG. 14F, or in settlement transactions described below with respect to FIG. 14C below. Register 1302 includes the total sum $ADSUM of deposits made to the electronic cache account since the last refresh transaction. Register 1303 contains the date of last refresh transaction $LDATE, to be used in case of a lost cache claim as described with respect to FIG. 14G below.

FIGS. 14A–G illustrate seven preferred basic transactions with an electronic cache.

Figure 14A:
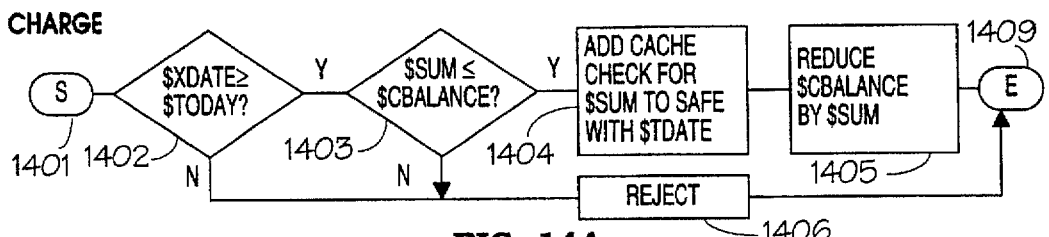
FIG. 14A–14G are schematic flow chart illustrations of seven operations with the preferred embodiment of FIGS. 12–13.

FIG. 14A illustrates a cache charge transaction, made for payment or for purse replenishment. First, as indicated in 1401, an electronic wallet 9 with electronic cache 320C is presented at card interface 351 of payment unit 8, for payment of a sum $SUM. In 1402 cache expiration date $XDATE read from register 333 of electronic cache 320C is checked, and if the card has expired, the transaction is rejected at 1406. A second validity check is made at 1403 for ensuring that $SUM is payable by the existing cache balance read from register 332. If the card is found valid, then in 1404 an electronic cache check for $SUM, which includes the account ID from register 321 along with the value of $SUM and the transaction date $TDATE, is registered in electronic safe 368, for immediate or deferred settlement as described in respect to FIG. 14C below. In 1404 $CBALANCE is reduced by $SUM and its updated value is recorded in register 332, and in 1409 transaction is completed and the card is returned to the customer.

Figure 14B:
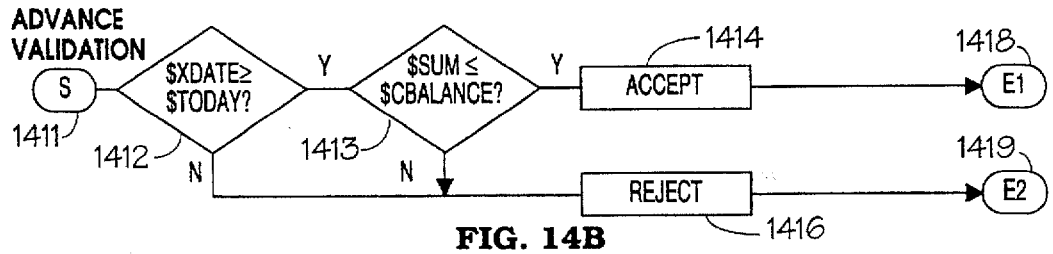

FIG. 14B illustrates an advance validation procedure, useful with a single-pass free-access retail described with respect to FIG. 7 above. In 1411 the card is received, and in 1412 and 1413, expiration and sufficiency checks are made to determine whether validity is positive in 1414 or negative in 1416. In 1418 the purchase procedure proceeds according to the procedure of FIG. 7 while the card is retained in the payment system, while in 1419 the card is returned and purchase is denied.

Figure 14C:
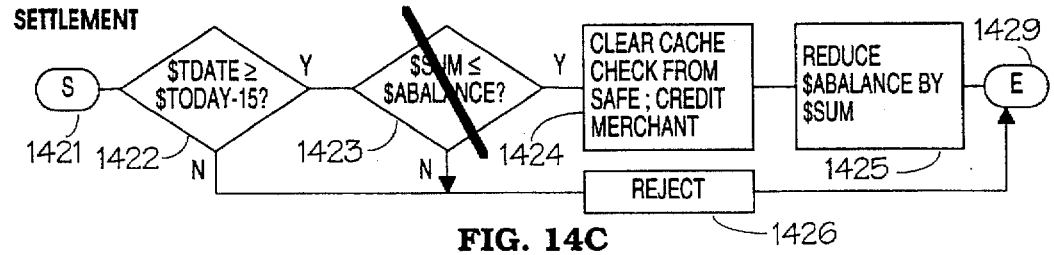

FIG. 14C illustrates a settlement transaction made through communication between a payment unit and a processing center of a financial institution 20. The transaction starts at 1421, where an electronic cache check stored in electronic safe 368 is presented for settlement to a processing center of financial institution 20 respective to the account ID. According to the system rules an electronic cache check must be presented for settlement within a predefined time from payment, e.g. 15 days. This is checked in 1422, and if the check is found too old, transaction is denied in 1426. The validity check in 1423 is redundant since when the cache check has been created by the transaction of FIG. 14A, $SUM has been found smaller or equal to $CBALANCE in 1403, and the refresh transaction of FIG. 14F ensures that in this case $SUM will be smaller or equal to $ABALANCE as well. Therefore, successful settlement with unexpired cache check is ensured in advance, which is a major advantage of the electronic cache concept. In 1424 the cache check is cleared from electronic safe 368 and the merchant's bank account is credited by $SUM. Then the value of $ABALANCE, the active balance stored in control register 1301, is reduced by $SUM, and the settlement transaction is completed.

Figure 14D:
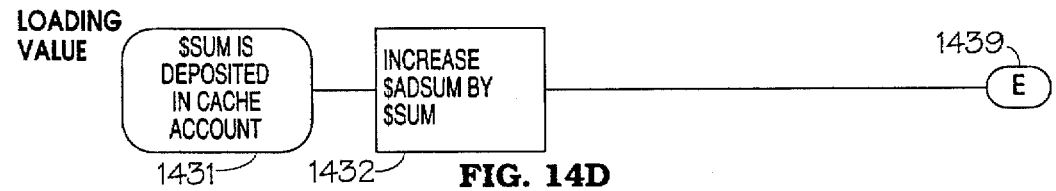

FIG. 14D illustrates a transaction of adding value to the electronic cache account in 383. Value is added in any way, such as conventional cash or check deposit or electronic funds transfer. It can be also an automatic reload transaction by a customer instructing his banker to load value into his cache account or to his child's cache account, periodically or as the cash account balance becomes low. In the case that the cache account is a credit account, loading value means credit renewal by payment or other arrangements between the customer and the respective financial institution. Loading additional value does not require the presence of the respective card, although the added value will not become accessible until the card communicates with the account during a refresh transaction (FIG. 14F). As a sum of $SUM is deposited in 1431, a conventional check deposit transaction takes place, and in 1432 the value of $ADSUM in control register 1302 of the respective account 383 is increased by $SUM.

Figure 14E:
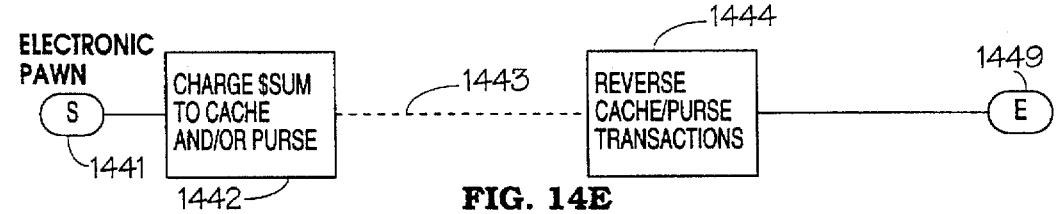
Figure 14F:
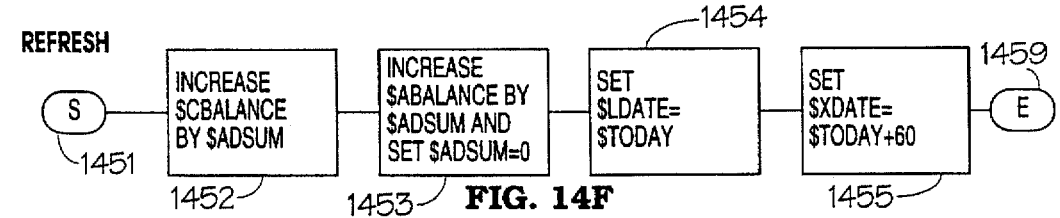

FIG. 14E illustrates an electronic pawn made with an electronic cache during a dual-pass free-access transaction described with reference to FIG. 8. At the beginning of transaction 1441 a card 9 with electronic cache 320C is presented at card interface 351 of a compatible payment terminal. The respective payment system described with respect to FIG. 4 is modified by including therein in its payment hub 22 an electronic cache transaction unit 367 from payment unit 8 of FIG. 12. In 1442 a payment of $SUM=$MAXP as shown in FIG. 8 is made according to the charge procedure of FIG. 14A. Then, purchase takes place in 1443. When the card is presented at the exit POS (block 810 of FIG. 8), the cache check in safe 386 is cancelled, the $CBALANCE value in register 332 is increased by $SUM=$MAXP, and payment is collected as needed in 1449, before the card is returned to the customer.

FIG. 14F illustrates the refresh transaction, which synchronizes between the electronic cache registers 332 and 333, and the cache account control registers 1301, 1302 and 1303. A refresh transaction can take place whenever card 9 communicates with financial institution 20, whether during other transactions or during a refresh transaction. A refresh transaction is essential for making funds added to the cache account accessible to the respective card and for extending the validity date of the card. At 1451 card 9 and the respective transaction processing center of financial institution 20 communicate. The respective cache account in 383 is identified according to account ID read from 321. In 1452 the value $CBALANCE of register 332 is increased by $ADSUM from register 1302, hence the total value added to the cache account during transactions of FIG. 14D now becomes accessible to the cache 320C in card 9. In 1453, $ABALANCE in control register 1301 is increased by $ADSUM. This maintains $ABALANCE larger than $CBALANCE by the total value of cache checks stored in electronic safes 368 and not yet presented for settlement. The value of $ADSUM in register 1302 is then reset to zero, reflecting successful synchronization of registers 1301 and 332. Finally, in 1454 the value in control register 1303 is set to the current date and in 1455 $XDATE, the cache expiration date in register 333, is extended by another, say, 60 days.

Figure 14G:
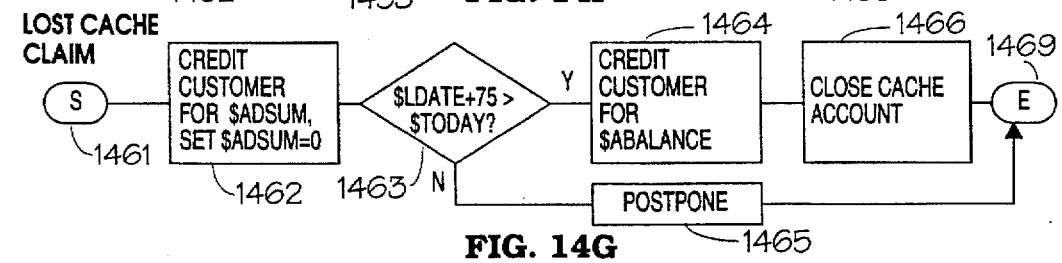

FIG. 14G illustrates the procedure of a customer claiming in 1461 the value of his cache account because his card is lost. Obviously, no information is available from the card, but the information in the cache account 383 is still available. In 1462 the customer is credited for $ADSUM read from register 1302 and the register is set to zero. The current date is then checked in 1463 and compared to the last refresh date $LDATE read from register 1303. If 75 days have not yet elapsed (60 days for the cache expiration period (1455 of FIG. 14F), and 15 days of the period allowed for presenting cache checks for settlement (1422 of FIG. 14C) then the customer is advised in 1465 to return after the period. Otherwise, the customer is credited for $ABALANCE read from register 1301, and the account is then closed in 1466.

Electronic Cache System with Pre-Scheduled Expenditure Rate

The electronic cache system described below is useful as a child payment instrument. It enables to provide children with electronic wallets under sufficient security and with pre-scheduled expenditure rate.

FIG. 15A illustrates the electronic cache 320C which includes, in addition to the registers described in reference to FIG. 12, a register 334 containing schedule load table designated $SCHEDS. The structure of $SCHEDS is described in FIG. 15C, wherein table 1500 contains records of which three, 1501A, 1501B and 1501C, are shown, each containing a date and a sum corresponding to that date.

FIG. 15B illustrates cache account control registers 383C, similar to those of FIG. 13 but with register 1302 replaced with register 1302S which includes scheduled added sum table designated $ADSUMT, whose structure is also described with reference to FIG. 15C.

FIG. 15C describes the data structure in both the scheduled load table 334 in FIG. 15A and the scheduled $ADSUM table 1302S of FIG. 15B.

Operations with the electronic cache are similar to those described in FIGS. 14A–G, with adjustments described herein in reference to FIG. 16A, 16B, 16D, 16F and 16G. The settlement and deposit procedures of FIG. 14C and 14E, respectively, remain intact.

Figure 16A:
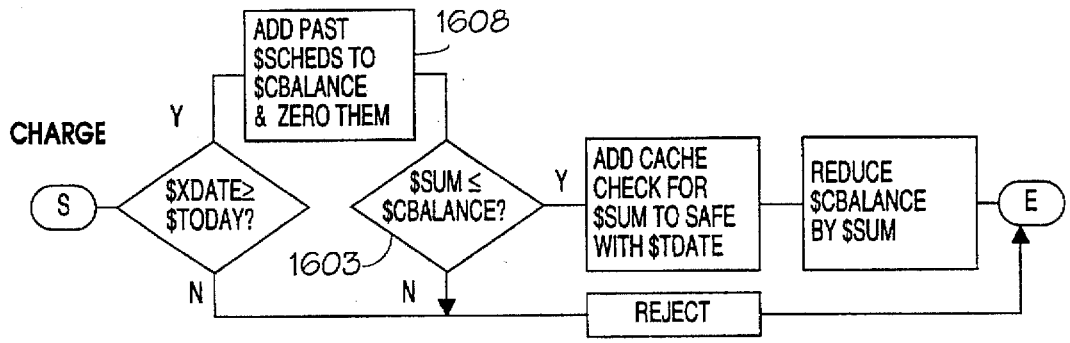
FIG. 16A, 16B, 16D, 16F and 16G are schematic flow chart illustrations describing variations of the respective operations from FIGS. 14A–14G according to the preferred embodiment described in FIG. 15A–15C.

FIG. 16A illustrates a charge procedure similar to that of FIG. 14A. However, prior to checking whether the balance is sufficient at 1603, procedure 1608 scans table 334 seeking records with dates up to the current date. If such records are found; the sum recorded in each such record is added to $CBALANCE in account balance register 332 and the record is then cleared from table 334. This allows adding pre-scheduled sums to the effective cache balance, thus providing off-line control over the expenditure rate. The rest of the procedure is the same as in FIG. 14.

Figure 16B:
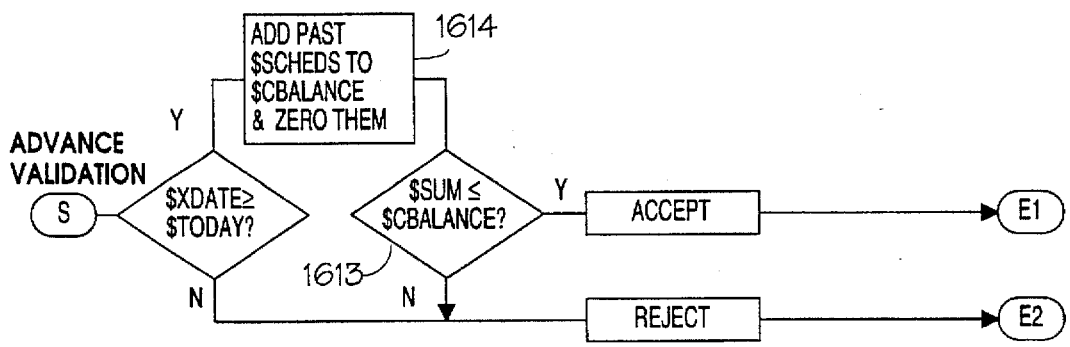

FIG. 16B illustrates an advance validation procedure. Prior to checking the sufficiency of $CBALANCE in 1613, $CBALANCE is updated by block 1614 similarly to block 1608 of FIG. 16A. The remainder of the procedure is the same as in FIG. 14B.

Figure 16D:
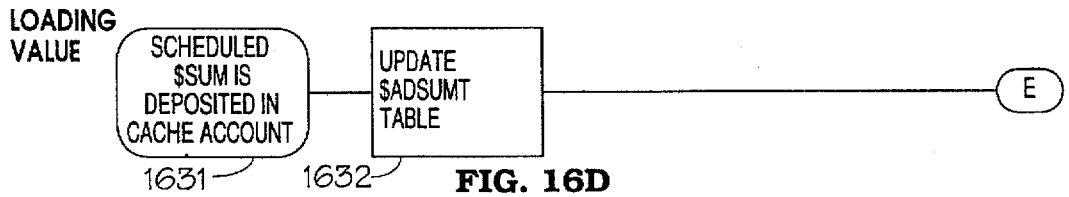

Loading value into the cache account is described in FIG. 16D. It is similar to the procedure illustrated in FIG. 14D, but with assigning a date to each deposited sum in 1631, and adding in 1632 both date and sum as an additional record to $ADSUMT table 1302S of FIG. 15B.

Figure 16F:
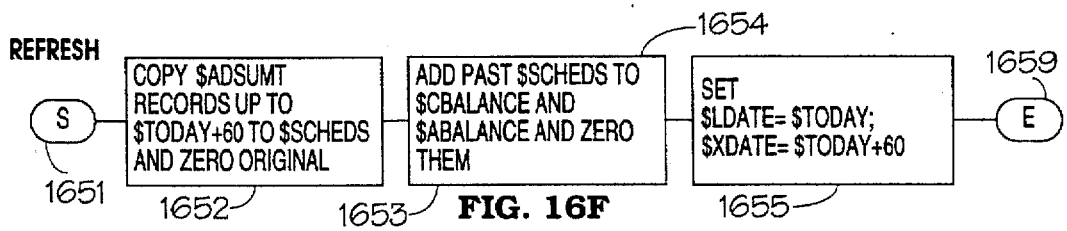

FIG. 16F describes a refresh procedure for the case under consideration. At 1651 electronic cache 320C of FIG. 15A and cache account control registers 383C of FIG. 15B communicate for a refresh transaction. In 1652 the records of table $ADSUMT 1302S relating to added sums scheduled up to the new expiration date ($TODAY+60 in this non limiting example) are copied to table $SCHEDS 334 of electronic cache 320C and are deleted from 1302S. In 1654, the total sum of all records in $SCHEDS table 334 up to the current date is added to $CBALANCE 332 and $ABALANCE 1301, and the records are deleted from table 334. In 1655 and 1659 the transaction is completed similarly to 1455 and 1459 of FIG. 14F.

Figure 16G:
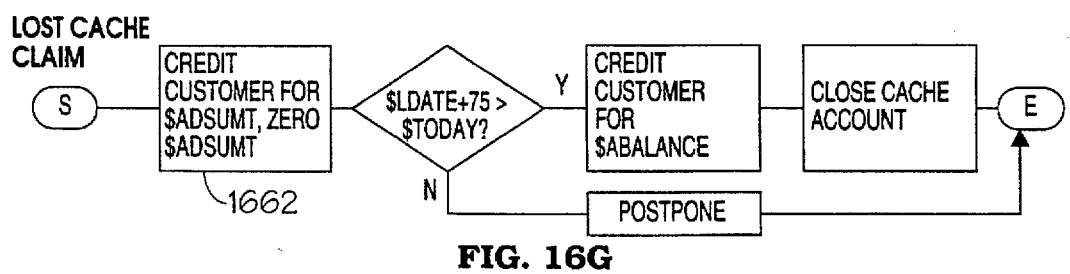

FIG. 16G describes the lost cache claim procedure. It is identical to the procedure of FIG. 14G, except that the immediate sum that the customer receives upon presenting his claim is calculated in 1662 as the total of all sums included in table 1302S of FIG. 15B.

Cards with Both Cache and Non-Cache Checkbooks

Figure 17:
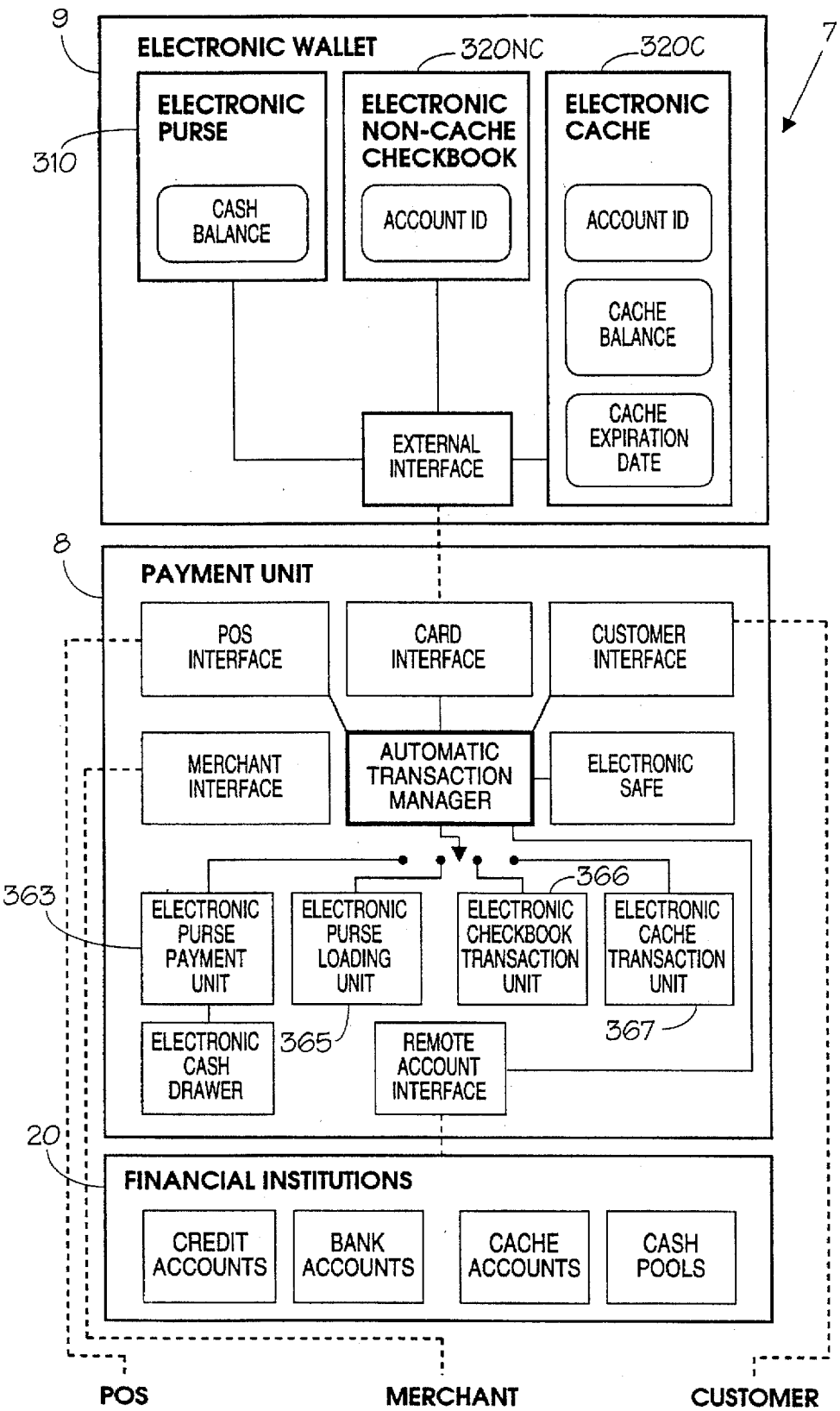
FIG. 17 is a schematic block diagram illustration of yet another payment system, constructed according to a preferred embodiment of the present invention.

FIG. 17 illustrates a preferred embodiment of the present invention which enables both cache and non-cache (i.e. conventional) checkbook central transactions. The reason for including both is that the cache is advantageous in off-line transactions. However, it can be used only with cache-compatible payment units capable of updating the cache balance (register 332 of FIG. 12A). Another limitation of a cache account is that it is accessible for payment only through the card containing the electronic cache and cannot be used for other payment forms such as paper checks or mail orders.

The payment system 7 of FIG. 17 comprises electronic wallets 9, payment units 8 and processing centers of financial institutions 20. Electronic wallet 9 comprises an electronic purse 310 for small value transactions, an electronic cache 320C for off-line central transactions and a non-cache electronic checkbook 320NC for general purpose usage and for loading value into and refreshing the cache during on-line communication. The payment unit 8 includes four operative units: electronic purse payment unit 363, electronic purse loading unit 365, electronic checkbook transaction unit 366 and electronic cache transaction unit 367. The automatic transaction manager 361 is operative to enable cache central transactions for payment, purse replenishment, advance validation and electronic pawn. However, if an electronic wallet presented at the payment unit 8 lack a cache or its cache is currently with insufficient cache balance, the payment unit may allow an off-line transaction with the non-cache electronic checkbook 320NC, provided that such a transaction is approved by the card issuer for the card class identified through the ID information of the specific electronic checkbook. If no off-line option is available for a specific card and there is a dial-up communication option with financial institutions 20, an on-line transaction with checkbook 320NC will be executed for payment and/or for loading value into the electronic cache account, according to the specific circumstances.

It will be appreciated that the present invention is not limited by what has been described hereinabove and that numerous modifications, all of which fall within the scope of the present invention, exist. For example, the point of sale and the payment unit of the present invention need not be separate units and may share some of the hardware components, such as their central processing unit, one example being a cash register version incorporating both units.

It will be appreciated by persons skilled in the art that the present invention is not limited to what has been particularly shown and described hereinabove. Rather, the scope of the present invention is defined only by the claims that follow:

I claim:

1. A retail unit serving a customer on a purchase, the customer having an electronic wallet for paying for a purchase via its electronic checkbook sums equal to or larger than a predetermined minimal checkbook payment sum, for paying from its electronic purse sums equal to or smaller than the value stored therein, and for paying for replenishing the electronic purse via the electronic checkbook sums equal to or larger than a predetermined minimal purse replenishment sum, the retail unit comprising:

a point of sale for determining a purchase price; and a payment unit including an electronic cash drawer, communicating with said point of sale for retrieving said purchase price therefrom and interfacing with said electronic wallet for automatically selecting, according to said purchase price, said value stored in said electronic purse, said minimal checkbook payment sum and said minimal purse replenishment sum, whether to receive said purchase price via said electronic checkbook, or to receive said purchase price from said electronic purse and deposit it in said electronic cash drawer, or to receive via said electronic checkbook a calculated purse replenishment sum which is at least the larger of said minimal purse replenishment sum and the difference between said purchase price and said value stored in said electronic purse, and to transfer from said electronic cash drawer to said electronic purse the difference between said calculated purse replenishment sum and said purchase price.

2. A retail unit serving a customer on a purchase, the customer having an electronic wallet including an electronic cache and an electronic purse, said electronic cache Including a storage device for storing a cache balance and an expiration date, said electronic wallet is operative for paying for a purchase via its electronic cache sums equal to or larger than a predetermined minimal checkbook payment sum, for paying from its electronic purse sums equal to or smaller than the value stored therein, and for paying for replenishing the electronic purse via the electronic cache sums equal to or larger than a predetermined minimal purse replenishment sum, the retail unit comprising:

a point of sale for determining a purchase price; and a payment unit communicating with said point of sale for retrieving said purchase price therefrom and interfacing with said electronic wallet for automatically selecting, according to said cache balance, said expiration date, said purchase price, said value stored in said electronic purse, said minimal checkbook payment sum and said minimal purse replenishment sum, whether to reject payments attempted on insufficient cache balance or after said expiration date, or to receive said purchase price via said electronic cache and to reduce said cache balance by said purchase price, or to receive said purchase price from said electronic purse, or to receive via said electronic cache a calculated purse replenishment sum which is at least the larger of said minimal purse replenishment sum and the difference between said purchase price and said value stored in said electronic purse, to reduce said cache balance by said calculated purse replenishment sum, and to replenish said electronic purse with the difference between said calculated purse replenishment sum and said purchase price.

3. A retail unit serving a customer on a purchase, the customer having an electronic wallet for paying for a purchase via its electronic checkbook sums equal to or larger than a predetermined minimal checkbook payment sum, for paying from its electronic purse sums equal to or smaller than the value stored therein, and for paying for replenishing said electronic purse via said electronic checkbook sums equal to or larger than a predetermined minimal purse replenishment sum, the retail unit comprising:

a point of sale for determining a purchase price; and a payment unit interfacing with said electronic wallet and communicating with said point of sale for retrieving said purchase price therefrom, said payment unit comprising:

an electronic checkbook transaction unit for receiving payment via said electronic checkbook;

an electronic cash drawer;

an electronic purse payment unit for receiving payment from said electronic purse and depositing it in said electronic cash drawer;

an electronic purse loading unit for replenishing said electronic purse by transferring a sum from said electronic cash drawer to said electronic purse; and an automatic transaction manager for automatically selecting, according to said purchase price, said value stored in said electronic purse, said minimal checkbook payment sum and said minimal purse replenishment sum, whether to activate said electronic checkbook transaction unit to receive said purchase price via said electronic checkbook, or to activate said electronic purse payment unit to receive said purchase price from said electronic purse and deposit it in said electronic cash drawer; or to activate said electronic checkbook transaction unit to receive via said electronic checkbook a calculated purse replenishment sum which is at least the larger of said minimal purse replenishment sum and the difference between said purchase price and said value stored in said electronic purse, and to activate said electronic purse loading unit to replenish said electronic purse from said electronic cash drawer with the difference between said calculated purse replenishment sum and said purchase price.

4. A retail unit serving a customer on a purchase, the customer having an electronic wallet for paying from its electronic purse sums equal to or smaller than the value stored therein, and for paying for replenishing said electronic purse via the electronic checkbook of said electronic wallet sums equal to or larger than a predetermined minimal purse replenishment sum, the retail unit comprising;

a point of sale for determining a purchase price; and a payment unit interfacing with said electronic wallet and communicating with said point of sale for retrieving said purchase price therefrom, the payment unit comprising:

an electronic cash drawer;

an electronic purse payment unit for receiving payment from said electronic purse and depositing it in said electronic cash drawer;

an electronic purse loading unit for replenishing said electronic purse by transfer from said electronic cash drawer;

an electronic checkbook transaction unit for receiving via said electronic checkbook sums for the replenishment of said electronic purse; and an automatic transaction manager for automatically selecting, according to said purchase price, said value stored in said electronic purse and said minimal purse replenishment sum, whether to activate said electronic purse payment unit to receive said purchase price from said electronic purse and deposit it in said electronic cash drawer, or to activate said electronic checkbook transaction unit to receive via said electronic checkbook a calculated purse replenishment sum which is at least the larger of said minimal purse replenishment sum and the difference between said purchase price and said value stored in said electronic purse, and to activate said electronic purse loading unit to transfer from said electronic cash drawer to said electronic purse the difference between said calculated purse replenishment sum and said purchase price.

5. A retail method for serving a customer addressing a payment unit in order to pay for a purchase, said payment unit including an electronic cash drawer, the customer having an electronic wallet for paying for a purchase via its electronic checkbook sums equal to or larger than a predetermined minimal checkbook payment sum, for paying from its electronic purse sums equal to or smaller than the value stored therein, and for paying for replenishing said electronic purse via said electronic checkbook sums equal to or larger than a predetermined minimal purse replenishment sum, the method comprising:

determining a purchase price; and automatically selecting, according to said purchase price, said value stored in said electronic purse, said minimal checkbook payment sum and said minimal purse replenishment sum, whether to receive said purchase price via said electronic checkbook, or to receive said purchase price from said electronic purse and deposit it in said electronic cash drawer, or to receive via said electronic checkbook a calculated purse replenishment sum which is at least the larger of said minimal purse replenishment sum and the difference between said purchase price and said value stored in said electronic purse, and to transfer from said electronic cash drawer to said electronic purse the difference between said calculated purse replenishment sum and said purchase price.

6. A retail method for serving a customer addressing a payment unit in order to pay for a purchase, the customer having an electronic wallet including an electronic cache and an electronic purse, said electronic cache including a storage device for storing a cache balance and an expiration date, said electronic wallet is operative for paying for a purchase via its electronic cache sums equal to or larger than a predetermined minimal checkbook payment sum, for paying from its electronic purse sums equal to or smaller than the value stored therein, and for paying for replenishing the electronic purse via the electronic cache sums equal to or larger than a predetermined minimal purse replenishment sum, the method comprising:

determining a purchase price; and automatically selecting, according to said purchase price, said value stored in said electronic purse, said minimal checkbook payment sum and said minimal purse replenishment sum, whether to reject payments attempted on insufficient cache balance or after said expiration date, or to receive said purchase price via said electronic cache and to reduce said cache balance by said purchase price, or to receive said purchase price from said electronic purse, or to receive via said electronic cache a calculated purse replenishment sum which is at least the larger of said minimal purse replenishment sum and the difference between said purchase price and said value stored in said electronic purse, to reduce said cache balance by said calculated purse replenishment sum, and to replenish said electronic purse with the difference between said calculated purse replenishment sum and said purchase price.

\* \* \* \* \*